United States Patent
Huang et al.

(10) Patent No.: US 12,417,209 B2
(45) Date of Patent: Sep. 16, 2025

(54) DISTRIBUTED FILE ACCESS METHOD AND RELATED DEVICE

(71) Applicant: HUAWEI TECHNOLOGIES CO., LTD., Guangdong (CN)

(72) Inventors: Libo Huang, Shenzhen (CN); Hao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 18/347,585

(22) Filed: Jul. 6, 2023

(65) Prior Publication Data

US 2023/0394008 A1   Dec. 7, 2023

Related U.S. Application Data

(63) Continuation of application No. PCT/CN2021/138556, filed on Dec. 15, 2021.

(30) Foreign Application Priority Data

Jan. 18, 2021   (CN) .......................... 202110064797.1

(51) Int. Cl.
G06F 16/14         (2019.01)
G06F 16/13         (2019.01)
G06F 16/172        (2019.01)

(52) U.S. Cl.
CPC .......... *G06F 16/148* (2019.01); *G06F 16/134* (2019.01); *G06F 16/172* (2019.01)

(58) Field of Classification Search
None
See application file for complete search history.

(56) References Cited

U.S. PATENT DOCUMENTS

| | | | |
|---|---|---|---|
| 11,481,662 B1* | 10/2022 | Chakraborty | ....... G06F 21/6218 |
| 2010/0293336 A1* | 11/2010 | Shribman | ........... G06F 12/0851 |
| | | | 711/170 |
| 2014/0019687 A1* | 1/2014 | Shribman | ............. G06F 12/023 |
| | | | 711/133 |
| 2015/0356116 A1 | 12/2015 | Lin et al. | |

(Continued)

FOREIGN PATENT DOCUMENTS

CN        111291011 A        6/2020

OTHER PUBLICATIONS

Levy E et al: "Distributed file systems: concepts and examples", ACM Computing Surveys, vol. 22, No. 4, DOI: 10.1145/98163.98169, 1990.12.01,XP002392825, total 54 pages.

(Continued)

*Primary Examiner* — Eliyah S. Harper

(57) ABSTRACT

A distributed file access method and a related device, applied to a first electronic device, where the first electronic device is in communication connection to a second electronic device, the first electronic device stores metadata of a first file on the second electronic device, and the metadata includes a file modification type and a file modification tag. The method includes: receiving a read instruction for the first file; reading the file modification type and the file modification tag of the first file; and reading the first file according to the file modification type and the file modification tag of the first file. The method can improve performance of file access between electronic devices.

20 Claims, 20 Drawing Sheets

(56) References Cited

U.S. PATENT DOCUMENTS

| | | | | |
|---|---|---|---|---|
| 2016/0004601 | A1* | 1/2016 | Ahn | G06F 11/1451 |
| | | | | 707/645 |
| 2016/0063021 | A1* | 3/2016 | Morgan | G06F 16/182 |
| | | | | 707/754 |
| 2016/0342661 | A1* | 11/2016 | Kumarasamy | G06F 16/2264 |
| 2017/0262350 | A1* | 9/2017 | Dornemann | G06F 16/172 |
| 2018/0018344 | A1* | 1/2018 | Kilaru | G06F 3/0643 |
| 2018/0137139 | A1* | 5/2018 | Bangalore | H04L 67/568 |
| 2018/0225177 | A1* | 8/2018 | Bhagi | G06F 16/164 |
| 2018/0285205 | A1* | 10/2018 | Mehta | G06F 11/1456 |
| 2018/0285382 | A1* | 10/2018 | Mehta | G06F 16/951 |
| 2019/0087281 | A1* | 3/2019 | Kumar | G06F 11/2094 |
| 2020/0356799 | A1* | 11/2020 | Pulido | G06F 16/587 |
| 2020/0364179 | A1* | 11/2020 | Khinvasara | G06F 16/113 |
| 2020/0409908 | A1* | 12/2020 | Ahn | G06F 3/065 |
| 2021/0034571 | A1* | 2/2021 | Bedadala | G06F 16/134 |
| 2021/0064485 | A1* | 3/2021 | Rana | G06F 11/1464 |
| 2023/0394008 | A1* | 12/2023 | Huang | G06F 16/178 |

OTHER PUBLICATIONS

Yevgeniy Vorobeychik :"File Access Patterns in Coda Distributed File System", URL:https://citeseerx.ist.psu.edu/document? repid=rep1andtype=pdfanddoi=7171db30c6f1dbe3b2cb0b365e300aedd7c23eff, Dec. 30, 2008, XP093154107 , total 8 pages.

* cited by examiner

| Classification by file name extension | Initializing file modification type |
|---|---|
| Media files with file name extensions such as .mp4 and .mp3 | Terminalless write type |
| Image files with file name extensions such as .jpg and .bmp | Terminalless write type |
| Document files with file name extensions such as .doc, .ppt, and .xls | Single-terminal write type |

File modification tag:

| Device ID | Timestamp |
|---|---|

FIG. 5A

File modification information:

| Base Tag | New Tag | offset+data |
|---|---|---|

FIG. 5B

File modification records:

| New Tag 1 | offset 1+data 1 |
|---|---|
| New Tag 2 | offset 2+data 2 |
| ⋮ | ⋮ |
| New Tag N | offset N+data N |

Tag:

| New Tag N |
|---|

FIG. 5C

| File modification type | Reading policy | Scenario frequency | Performance | Remarks |
|---|---|---|---|---|
| Terminalless write type | An electronic device caches a file, and only needs to check a File Type field in metadata. | High frequency | High network utilization, and relatively high performance | Such files include pictures, videos, and audio. Usually, only read operations are performed. |
| Single-terminal write type | The electronic device caches a file, and checks a File Type field and a Tag field in metadata. If a device ID in the Tag field is not an ID of the electronic device, the electronic device requests a file modification record from a remote device, and caches a difference part of the file. | High frequency | Most scenarios are equivalent to local caching operations, which greatly improves performance. | Such files include document files, which are usually edited across devices. In most cases, the files are written by a single terminal. |
| Occasional multi-terminal write type | The electronic device caches a file, and checks a File Type field and a Tag field in metadata. If a device ID in the Tag field is not an ID of the electronic device, the electronic device requests a file modification record from a remote device, and caches a difference part of the file. | Low frequency | Most scenarios are equivalent to local caching operations, which greatly improves performance. | Such files include document files, and are usually continuously edited across devices. Especially in the case of a single account, a user can edit the files on one device and then switch to another device for continuous editing. |
| Frequent multi-terminal write type | The electronic device does not cache a file, and reads the file from the accessed end each time. | Low frequency | Performance is equivalent to that of remote file read and write mode in an SMB protocol. | Multi-terminal real-time editing scenario |

FIG. 7

DISTRIBUTED FILE ACCESS METHOD AND RELATED DEVICE

CROSS-REFERENCE TO RELATED APPLICATIONS

This application is a continuation of International Application No. PCT/CN2021/138556 filed on Dec. 15, 2021, which claims priority to Chinese Patent Application No. 202110064797.1 filed on Jan. 18, 2021. The disclosures of the aforementioned applications are hereby incorporated by reference in their entireties.

TECHNICAL FIELD

This application relates to the field of terminal technologies, and in particular, to a distributed file access method and a related device.

BACKGROUND

With continuous development of network technologies and information technologies, intelligent terminals such as mobile phones, tablets, computers, and vehicle-mounted devices are increasingly widely applied. In addition to providing convenient data storage and access services for users, intelligent terminals also generate a requirement for data access between different terminals. Existing distributed file access methods (such as remote file read/write in an SMB (Server Message Block, server message block) protocol, and file read/write based on a file proxy mode in an NFS (network file system) protocol) are mainly applied to a large-scale clusters, centralized and ideal network environment, and provides devices with high-throughput data access. In this distributed file access method, file access between devices is implemented by using a server, which is highly dependent on network stability. When the network is unstable, file access takes a long time. The intelligent terminals are generally in a complex and unstable network environment, and the terminals are not in communication connection through a server. It is clear that, an existing distributed file access method is not suitable for a scenario of file access between the terminals.

SUMMARY

Embodiments of this application disclose a distributed file access method and a related device, to improve performance of file access between electronic devices.

A first aspect of this application discloses a distributed file access method, applied to a first electronic device, where the first electronic device is in communication connection to a second electronic device, the first electronic device stores metadata of a first file on the second electronic device, the metadata includes a file modification type and a file modification tag, and the method includes:
    receiving a read instruction for the first file;
    reading a file modification type and a file modification tag of the first file; and
    reading the first file according to the file modification type and the file modification tag of the first file.

When reading a file across devices, the electronic device obtains the file modification type and the file modification tag of the file, and reads the file according to the file modification type and the file modification tag. The electronic device may adopt different read policies for different file modification types and file modification tags, thereby improving performance of distributed file access.

In some optional implementations, the file modification type includes at least one of the following: a terminalless write type, a single-terminal write type, an occasional multi-terminal write type, or a frequent multi-terminal write type.

In some optional implementations, the reading the first file according to the file modification type and the file modification tag includes:
    if the file modification type of the first file is the frequent multi-terminal write type, reading the first file from the second electronic device.

In some optional implementations, the reading the first file according to the file modification type and the file modification tag includes:
    if the file modification type of the first file is the terminalless write type, the single-terminal write type, or the occasional multi-terminal write type, and the first file is not in a local cache of the first electronic device, downloading the first file from the second electronic device and caching the first file locally, and reading the first file from the local cache of the first electronic device.

For a remote file of the terminalless write type, the single-terminal write type, or the occasional multi-terminal write type, in this application, the remote file is cached locally and then read, thereby improving file reading efficiency.

In some optional implementations, the reading the first file according to the file modification type and the file modification tag includes:
    if the file modification type of the first file is the terminalless write type, and the first file is in a local cache of the first electronic device, or if the file modification type of the first file is the single-terminal write type or the occasional multi-terminal write type, the first file is in a local cache of the first electronic device, and a device ID in the file modification tag of the first file is the same as a device ID of the first electronic device, reading the first file from the local cache of the first electronic device.

In some optional implementations, the reading the first file according to the file modification type and the file modification tag includes:
    if the file modification type of the first file is the single-terminal write type or the occasional multi-terminal write type, the first file is in the local cache, and a device ID in the file modification tag of the first file is different from a device ID of the first electronic device, obtaining a file modification record of the first file from the second electronic device, updating the first file according to the file modification record of the first file, and reading the updated first file.

In some optional implementations, the file modification record includes modification location information and a modified part, and the updating the first file according to the file modification record of the first file includes:
    updating, according to the modification location information, the modified part to the first file locally cached by the first electronic device; or
    the file modification record includes the modification location information and a size of modified data, and the updating the first file according to the file modification record of the first file includes:
    obtaining the modified part of the first file from the second electronic device according to the modification location information and the size of the modified data, and updating, according to the modification location information, the modified part to the first file locally cached by the first electronic device.

In some optional implementations, the first electronic device further stores a second file, metadata of the second file, and a file modification record of the second file, the second electronic device stores the metadata of the second file, and the method further includes:

obtaining a modification instruction for the second file; and in response to the modification instruction for the second file, modifying the second file, and updating the file modification record of the second file.

In some optional implementations, the method further includes:

updating a file modification type and a file modification tag in the metadata of the second file according to the file modification record of the second file; and synchronizing the updated metadata of the second file to the second electronic device.

In some optional implementations, the method further includes:

obtaining a modification instruction for the first file;

in response to the modification instruction for the first file, generating file modification information of the first file, where the file modification information includes a file modification tag before modification, a file modification tag after modification, the modification location information, and the modified part; and sending a file modification request to the second electronic device, where the file modification request carries the file modification information of the first file.

In some optional implementations, the updating a file modification type and a file modification tag in the metadata of the second file according to the file modification information of the second file and an updated file modification record of the second file includes:

if the file modification type of the second file is the terminalless write type, modifying the file modification type of the second file to the single-terminal write type; or if the file modification type of the second file is the single-terminal write type, two or more devices modify the second file in a fixed time window, and a time interval between times when the two or more devices modify the second file is less than a preset time interval, modifying the file modification type of the second file to the frequent multi-terminal write type; or if the file modification type of the second file is the single-terminal write type, two or more devices modify the second file in a fixed time window, and a time interval between times when the two or more devices modify the second file is greater than or equal to a preset time interval, modifying the file modification type of the second file to the occasional multi-terminal write type; or if the file modification type of the second file is the occasional multi-terminal write type, two or more devices modify the second file in a fixed time window, and a time interval between times when the two or more devices modify the second file is less than a preset time interval, modifying the file modification type of the second file to the frequent multi-terminal write type; or if the file modification type of the second file is the occasional multi-terminal write type, and no two or more devices modify the second file in a fixed time window, modifying the file modification type of the second file to the single-terminal write type; or if the file modification type of the second file is the frequent multi-terminal write type, two or more devices modify the second file in a fixed time window, and a time interval between times when the two or more devices modify the second file is greater than or equal to a preset time interval, modifying the file modification type of the second file to the occasional multi-terminal write type; or if the file modification type of the second file is the frequent multi-terminal write type, and no two or more devices modify the second file in a fixed time window, modifying the file modification type of the second file to the single-terminal write type.

In this application, different initial file modification types are selected for different files, and the file modification type is adaptively switched in a scenario in which different files conflict. Compared with a conventional file access method, in scenarios of terminalless write, single-terminal write, and occasional multi-terminal write, the file access method provided in this application has better performance, and performance is improved more significantly in a high-latency network condition. This application reduces one-time instantaneous real-time protocol transmissions of a device. Compared with the proxy mode in the NFS protocol, this application reduces network interaction, and avoids a case in which a write operation is exclusive. In this application, when a network of a single device is unstable, operating performance of another device is not affected.

In some optional implementations, the updating a file modification type and a file modification tag in the metadata of the second file according to the file modification information of the second file and an updated file modification record of the second file further includes:

if the updated file modification type of the second file is the single-terminal write type or the occasional multi-terminal write type, and a file modification tag before modification in the file modification information of the second file is different from the file modification tag in the metadata of the second file, or if the updated file modification type of the second file is the frequent multi-terminal write type, generating a new file modification tag for the second file; and updating the file modification tag in the metadata of the second file to the new file modification tag; or if the updated file modification type of the second file is the single-terminal write type or the occasional multi-terminal write type, and a file modification tag before modification in the file modification information of the second file is the same as the file modification tag in the metadata of the second file, updating the file modification tag in the metadata of the second file to a file modification tag after modification in the file modification information of the second file.

In some optional implementations, the modification location information includes a modification location offset.

A second aspect of this application discloses a distributed file access apparatus, applied to a first electronic device, where the first electronic device is in communication connection to a second electronic device, the first electronic device stores metadata of a first file on the second electronic device, the metadata includes a file modification type and a file modification tag, and the apparatus includes:

a receiving module, configured to receive a read instruction for the first file; and a reading module, configured to: read the file modification type and the file modification tag of the first file, and read the first file according to the file modification type and the file modification tag of the first file.

In some optional implementations, the file modification type includes at least one of the following: a terminalless write type, a single-terminal write type, an occasional multi-terminal write type, or a frequent multi-terminal write type.

In some optional implementations, the reading module is configured to:
if the file modification type of the first file is the frequent multi-terminal write type, read the first file from the second electronic device.

In some optional implementations, the reading module is configured to:
if the file modification type of the first file is the terminalless write type, the single-terminal write type, or the occasional multi-terminal write type, and the first file is not in a local cache of the first electronic device, download the first file from the second electronic device and cache the first file locally, and read the first file from the local cache of the first electronic device.

In some optional implementations, the reading module is configured to:
if the file modification type of the first file is the terminalless write type, and the first file is in a local cache of the first electronic device, or if the file modification type of the first file is the single-terminal write type or the occasional multi-terminal write type, the first file is in a local cache of the first electronic device, and a device ID in the file modification tag of the first file is the same as a device ID of the first electronic device, read the first file from the local cache of the first electronic device.

In some optional implementations, the reading module is configured to:
if the file modification type of the first file is the single-terminal write type or the occasional multi-terminal write type, the first file is in the local cache, and a device ID in the file modification tag of the first file is different from a device ID of the first electronic device, obtain a file modification record of the first file from the second electronic device, update the first file according to the file modification record of the first file, and read the updated first file.

In some optional implementations, the file modification record includes modification location information and a modified part, and the reading module is configured to:
update, according to the modification location information, the modified part to the first file locally cached by the first electronic device; or
the file modification record includes modification location information and a size of modified data, and the reading module is configured to:
obtain the modified part of the first file from the second electronic device according to the modification location information and the size of the modified data, and update, according to the modification location information, the modified part to the first file locally cached by the first electronic device.

In some optional implementations, the first electronic device further stores a second file, metadata of the second file, and a file modification record of the second file, the second electronic device stores the metadata of the second file, and the apparatus further includes:
an in-device modification module, configured to obtain a modification instruction for the second file; where the in-device modification module is further configured to: in response to the modification instruction for the second file, modify the second file, and update the file modification record of the second file.

In some optional implementations, the in-device modification module is further configured to: update the file modification type and the file modification tag in the metadata of the second file according to the file modification record of the second file, and synchronize the updated metadata of the second file to the second electronic device.

In some optional implementations, the apparatus further includes:
a cross-device modification module, configured to: obtain a modification instruction for the first file; in response to the modification instruction for the first file, generate file modification information of the first file, where the file modification information includes a file modification tag before modification, a file modification tag after modification, modification location information, and a modified part; and send a file modification request to the second electronic device, where the file modification request carries the file modification information of the first file.

A third aspect of this application discloses a distributed file access method, applied to a second electronic device, where the second electronic device is in communication connection to a first electronic device, the second electronic device stores a first file, metadata of the first file, and a file modification record of the first file, the metadata includes a file modification type and a file modification tag, and the method includes:
synchronizing the metadata of the first file to the first electronic device; and
if a modification record obtaining request sent by the first electronic device is received, returning the file modification record of the first file to the first electronic device.

In some optional implementations, the method further includes:
if a file modification request for the first file that is sent by the first electronic device is received, modifying the first file according to the file modification request;
updating the file modification record of the first file;
updating the metadata of the first file; and
synchronizing the updated metadata of the first file to the first electronic device.

A fourth aspect of this application discloses a distributed file access apparatus, applied to a second electronic device, where the second electronic device is in communication connection to a first electronic device, the second electronic device stores a first file, metadata of the first file, and a file modification record of the first file, the metadata includes a file modification type and a file modification tag, and the apparatus includes:
a synchronization module, configured to synchronize the metadata of the first file to the first electronic device; and
a modification response module, configured to: if a modification record obtaining request sent by the first electronic device is received, return the file modification record of the first file to the first electronic device.

In some optional implementations, the modification response module is further configured to: if a file modification request for the first file that is sent by the first electronic device is received, modify the first file according to the file modification request, update the file modification record and the metadata of the first file, and synchronize the updated metadata of the first file to the first electronic device.

A fifth aspect of this application discloses a computer program product, where when the computer program product runs on a computer, the computer is enabled to perform the distributed file access method according to the first aspect or the third aspect.

A sixth aspect of this application discloses a computer-readable storage medium, including a computer instruction, where when the computer instructions are run on an electronic device, the electronic device is enabled to perform the distributed file access method according to the first aspect or the third aspect.

A seventh aspect of this application discloses an electronic device. The electronic device includes a processor and a memory, where the memory is configured to store instructions, and the processor is configured to invoke the instructions in the memory, so that the electronic device performs the distributed file access method according to the first aspect or the third aspect.

An eighth aspect of this application discloses a chip system. The chip system is applied to an electronic device. The chip system includes an interface circuit and a processor. The interface circuit and the processor are interconnected by using a line. The interface circuit is configured to receive a signal from a memory of the electronic device, and send the signal to the processor, where the signal includes computer instructions stored in the memory. When the processor executes the computer instructions, the chip system performs the distributed file access method according to the first aspect or the third aspect.

It should be understood that the distributed file access apparatuses according to the second aspect and the fourth aspect, the computer program product according to the fifth aspect, the computer-readable storage medium according to the sixth aspect, the electronic device according to the seventh aspect, and the chip system according to the eighth aspect correspond to the methods according to the first aspect and the second aspect. Therefore, for beneficial effects that can be achieved by the distributed file access apparatuses, the computer program product, the computer-readable storage medium, and the chip system, refer to the beneficial effects in the corresponding methods provided above. Details are not described herein again.

BRIEF DESCRIPTION OF DRAWINGS

FIG. 5A to FIG. 5C are a schematic diagram of a file modification tag, file modification information, and a file modification record used in this application;

FIG. 7 shows policies for reading a file across devices and related analysis in a distributed file access method according to this application;

DESCRIPTION OF EMBODIMENTS

For ease of understanding, descriptions of some concepts related to embodiments of this application are provided as examples for reference, as shown in the following:

It should be noted that, in this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. In this specification, claims, and accompanying drawings of this application, terms "first", "second", "third", "fourth", and the like (if existent) are intended to distinguish between similar objects but do not necessarily indicate a specific order or sequence.

To better understand a distributed file access method and a related device disclosed in embodiments of this application, the following first describes an application scenario of the distributed file access method according to this application.

Figure 1:
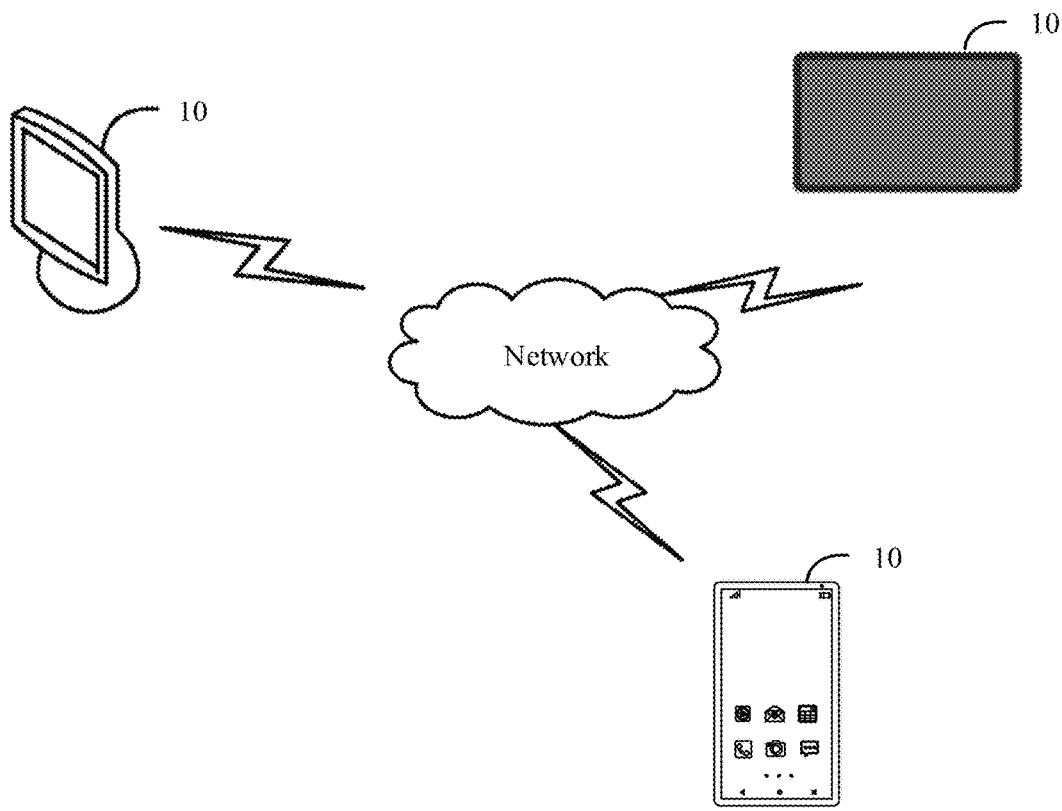
FIG. 1 is a schematic diagram of an application scenario of a distributed file access method according to an embodiment of this application.

FIG. 1 is a schematic diagram of an application scenario of a distributed file access method according to an embodiment of this application. As shown in FIG. 1, a plurality of electronic devices 10 are in communication connection through a network (that is, a distributed network), and the electronic device 10 performs inter-device file access according to a file modification type and a file modification tag, to improve performance of file access between the electronic devices 10.

The electronic device 10 may be a mobile phone, a tablet, a computer, a vehicle-mounted device, a large screen, a smart band, a smartwatch, or the like. As shown in FIG. 1, the electronic devices 10 in the distributed network include a mobile phone, a tablet, and a large screen.

The distributed network may be established for a plurality of electronic devices 10, and file access may be performed between any two electronic devices 10 in the distributed network by using the distributed file access method according to this application. Each electronic device 10 in the distributed network may provide a local file for another electronic device to access, or may access a file on another electronic device.

The electronic devices 10 may be wirelessly connected or wiredly connected. The electronic devices 10 may be in stable communication connection, or may be in unstable communication connection. In an embodiment of this application, short-range wireless communication may be performed between the electronic devices 10. For example, the electronic devices 10 may perform short-range wireless communication with each other by using Bluetooth, Wi-Fi, near field communication (NFC), a ZigBee technology, an infrared data association (IrDA) technology, an ultra wideband (UWB) technology, or a wireless universal serial bus (USB).

Figure 2:
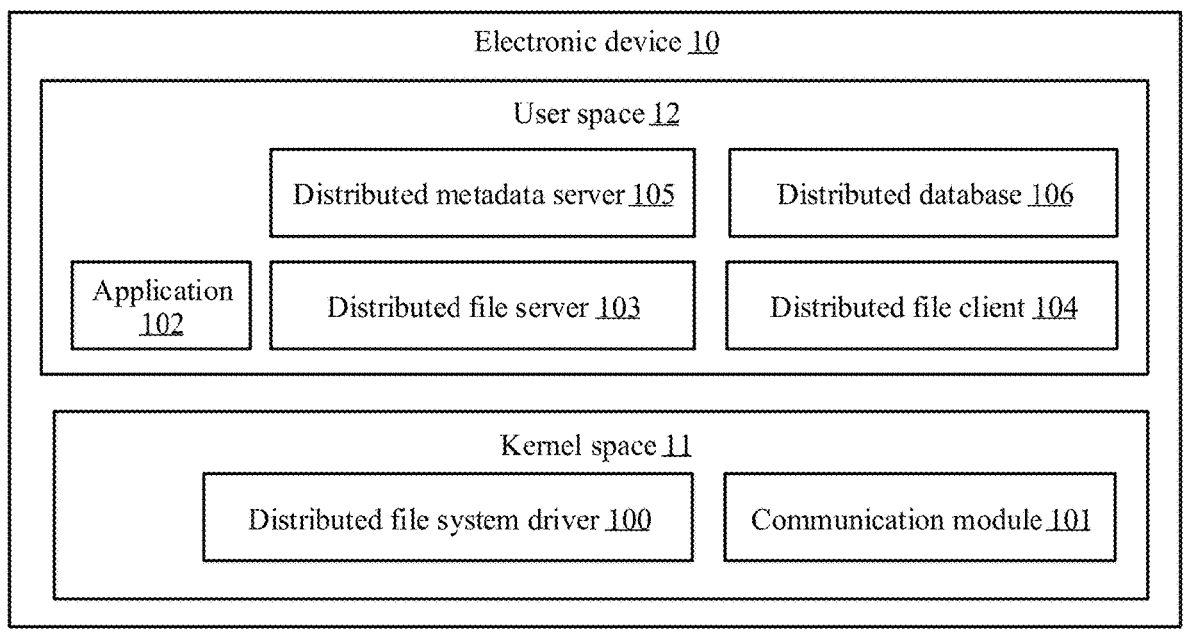
FIG. 2 is a diagram of a software architecture of an electronic device for implementing a distributed file access method according to this application.

FIG. 2 is a diagram of a software architecture of an electronic device 10 for implementing a distributed file access method according to this application.

As shown in FIG. 2, the electronic device 10 may include a distributed file system driver 100, a communication module 101, an application 102, a distributed file server 103, a distributed file client 104, a distributed metadata server 105, and a distributed database 106. The electronic device 10 may include a kernel space 11 and a user space 12. In an embodiment of this application, the distributed file system driver 100 and the communication module 101 are located in the kernel space 11 of the electronic device 10, and the application 102, the distributed file server 103, the distributed file client 104, the distributed metadata server 105, and the distributed database 106 are located in the user space 12 of the electronic device 10.

In another embodiment of this application, the distributed file system driver 100, the distributed file server 103, the distributed file client 104, the distributed metadata server 105, and the distributed database 106 may be distributed in another manner. For example, the distributed file system driver 100, the distributed file server 103, the distributed file client 104, the distributed metadata server 105, and the distributed database 106 may all be located in the kernel space 11. For another example, the distributed file system driver 100 may be located in the kernel space 11, and the distributed file server 103, the distributed file client 104, the distributed metadata server 105, and the distributed database 106 may be located in the user space 12.

The distributed file system driver 100 is configured to provide a distributed file access capability.

The communication module 101 is configured to communicate with another electronic device.

The application 102 may be any application that can run on the electronic device 10, for example, a utility application, a social chat application, or a media application. The electronic device 10 accesses a file by using the application 102. For example, the electronic device 10 includes a music player, and the electronic device 10 plays an audio file on another electronic device by using the music player. For another example, the electronic device 10 includes a text editor, and the electronic device 10 edits a text in another electronic device by using the text editor.

The distributed file server 103 is configured to provide capabilities of managing and accessing local files.

The distributed file client 104 is configured to interact with the distributed file server 103, so as to implement file access between devices. For example, the distributed file client 104 of a device B interacts with the distributed file server 103 of the device A to access a file on a device A.

The distributed metadata server 105 is responsible for synchronizing and managing metadata of each electronic device. The distributed metadata server 105 may generate a distributed file directory, and display a file of each electronic device in the distributed file directory. The distributed database 106 is configured to store metadata of a file.

The metadata stored in each electronic device (for example, the device B) includes metadata of a local file, and further includes metadata of a remote file (for example, a file on the device A) synchronized from a remote device (for example, the device A).

The metadata of a file is used to record file attribute information, such as a file name, a file size, a file location, and a last modification time. Before performing an operation (for example, reading or editing) on a file, file location information of the file needs to be obtained, a location of the file needs to be located according to the file location information, and content of the file needs to be obtained from the location. For example, the device B may obtain file location information of a file on the device A according to metadata synchronized from the device A, and access the file on the device A according to the file location information.

In the distributed file access method in this application, two fields are added to metadata of a file: a file modification type and a file modification tag, so as to improve performance of cross-device file access. For details about the file modification type and the file modification tag, refer to related descriptions in FIG. 3.

Figures 3, 4:
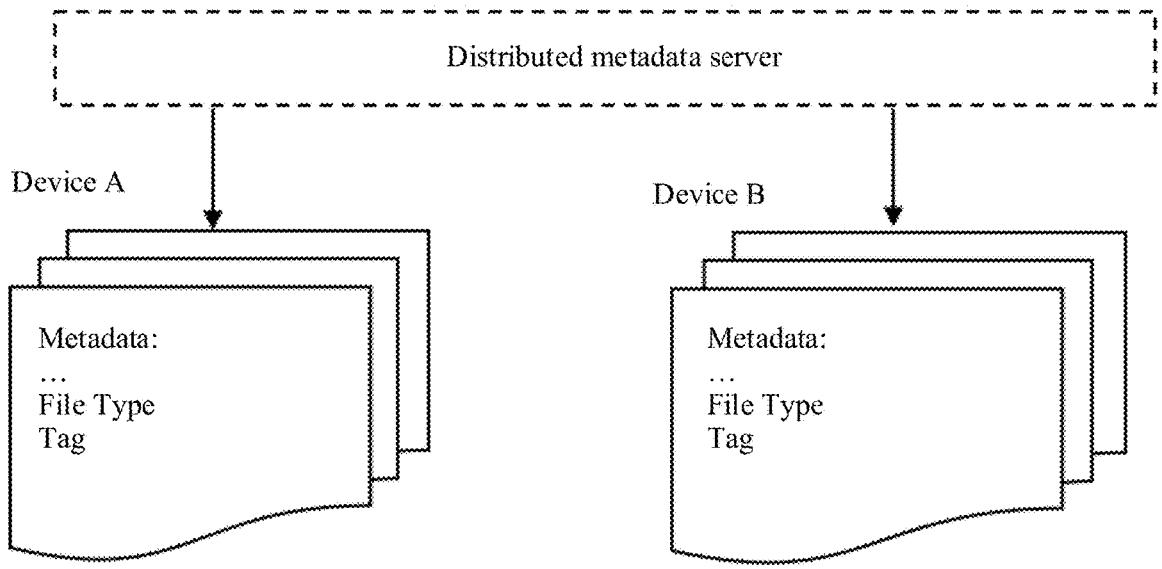
FIG. 3 is a schematic diagram of metadata used in this application.
FIG. 4 is a schematic diagram of initializing a file modification type.

FIG. 3 is a schematic diagram of metadata used in this application.

As shown in FIG. 3, the metadata used in this application includes two fields: a file modification type (represented as File Type) and a file modification tag (represented as Tag). An electronic device (for example, a device A) determines the file modification type and the file modification tag in the metadata of a local file, and synchronizes the metadata including the file modification type and the file modification tag to another electronic device (for example, a device B) by using a distributed metadata server.

In an embodiment of this application, the file modification type includes a terminalless write type, a single-terminal write type, an occasional multi-terminal write type, and a frequent multi-terminal write type.

It should be understood that, in other embodiments of this application, another file modification type may be used. For example, the file modification type includes a read-only type, the single-terminal write type, the occasional multi-terminal write type, and the frequent multi-terminal write type. A quantity of the file modification types may be more (for example, five) or less (for example, three). For example, the file modification type includes the read-only type, the terminalless write type, the single-terminal write type, and a multi-terminal write type. Terminalless write type: No device modifies a file in a fixed time window (for example, minutes before a current time). For example, if a user uses the device B to read a media file of the device A, and the media file is not modified in a fixed time window, the media file is of the terminalless write type.

Single-terminal write type: A device modifies a file in a fixed time window. For example, if a user uses the device B to modify a document file of the device A, and no other device modifies the document file in a fixed time window, the document file is of the single-terminal write type.

Occasional multi-terminal write type: Two or more devices modify a file in a fixed time window, and a time interval between times when different times modify the file is greater than or equal to a preset time interval (for example, 10 seconds), or a quantity of modification times of the file is less than or equal to a preset quantity, or a quantity of devices that modify the file is less than or equal to a preset quantity. For example, if a user uses the device B to modify a document file of the device A, and then uses a device C to continue to modify the document file of the device A, a time interval between a time when the device B modifies the document file and a time when the device C modifies the document file is greater than 10 seconds, and the device B and the device C do not modify the document file of the device A at the same time, the document file is of the occasional multi-terminal write type.

Frequent multi-terminal write type: Two or more devices modify a file in a fixed time window, and a time interval between times when different devices modify the file is less than a preset time interval, or a quantity of modification times of the file is greater than a preset quantity, or a quantity of devices that modify the file is greater than a preset quantity. For example, if a first user modifies the document file of the device A on the device B and a second user modifies the document file of the device A on the device C at the same time, the document file is of the frequent multi-terminal write type.

It should be noted that, when the file modification type is determined, the device that modifies the file (for example, the file on the device A) may be a device to which the file belongs (for example, the device A), or may be a remote device (for example, the device B). For example, if the device A includes a file "test", and the device A and the device B modify the file "test" in a fixed time window, the two devices modify the file "test".

In an embodiment of this application, the electronic device may update the file modification type of the local file according to a preset update time interval. During each update, if no device modifies the file in the fixed time window, the file modification type is modified to the terminalless write type; or if one device modifies the file in the fixed time window, the file modification type is modified to the single-terminal write type; or if two or more devices modify the file in the fixed time window, and the time interval between the times when different devices modify the file is greater than or equal to the preset time interval, or the quantity of modification times of the file is less than or equal to the preset quantity, or the quantity of devices that modify the file is less than or equal to the preset quantity, the file modification type is modified to the occasional multi-terminal write type; or if two or more devices modify the file in the fixed time window, and the time interval between the times when different devices modify the file is less than the preset time interval, or the quantity of modification times of the file is greater than the preset quantity, or the quantity of devices that modify the file is greater than the preset quantity, the file modification type is modified to the frequent multi-terminal write type.

A file modification type may be initialized for each file. In a file access process, the distributed file server updates the file modification type in the metadata according to a modification status of the file.

FIG. 4 is a schematic diagram of initializing a file modification type. The file modification type may be initialized according to a file name extension. For example, as shown in FIG. 4, media files with file name extensions such as .mp4 and .mp3 and image files with file name extensions such as .jpg and .bmp may be initialized to the terminalless write type, and document files with file name extensions such as .doc, .ppt, and .xls may be initialized to the single-terminal write type.

In an embodiment of this application, an initialization setting interface of a file may be displayed on an electronic device, and a user may set or adjust an initial file modification type of the file by using the initialization setting interface. For example, an initial file modification type is preset for each file according to a file name extension of the file (for example, an initial file modification type of a file with the file name extension .mp4 is preset as the terminalless write type), and the user may adjust the initial file modification type of the file by using an initialization setting interface (for example, the user may adjust the file modification type of the file with the file name extension .mp4 to the single-terminal write type).

FIG. 5A is a schematic diagram of a file modification tag used in this application.

The file modification tag is used to identify each modification performed by an electronic device on a file. The file modification tag in metadata indicates the latest modification of the file.

Refer to FIG. 5A. In an embodiment of this application, the file modification tag includes a device identifier (identifier, ID) and a timestamp, so as to ensure uniqueness of the file modification tag. The device ID indicates a device that modifies the file, and the timestamp indicates a time when the file is modified.

In other embodiments of this application, the file modification tag may include a device ID and a modification number. For example, a device A modifies the file for a plurality of times, the file modification tag corresponding to the first modification may be A+1, and the file modification tag corresponding to the second modification may be A+2, where A is the device ID, and 1 and 2 are modification numbers.

When an electronic device (for example, the device A) stores a new file (for example, stores a newly created document file, or stores a downloaded audio file), the device ID in the file modification tag may be set to the device ID of the electronic device (for example, the device A), and the timestamp may be set to the storage time of the file.

After modifying the file, the electronic device generates a new file modification tag for the file. For example, a device B modifies a file on the device A, and a file modification tag of the file before modification is "A+1", and a new file modification tag B+1 is generated after modification.

FIG. 5B is a schematic diagram of file modification information used in this application.

An electronic device sends file modification information to a remote device when modifying a file of the remote device. Refer to FIG. 5B. In an embodiment of this application, the file modification information includes a file modification tag before modification, a file modification tag after modification, modification location information, and a modified part. In the figure, "Base Tag" indicates the file modification tag before modification, "New Tag" indicates the file modification tag after modification, "offset" indicates the modification location information, and "data" indicates the modified part.

The file modification tag before modification is a file modification tag in metadata. The file modification tag after modification is a new file modification tag generated for the current modification.

The modification location information indicates the modification location of the file. The modification location information may be a modification location offset.

The modified part indicates modified content of the file.

In another embodiment of this application, the file modification information may further include a size of modified data. For example, if the electronic device modifies data of one byte in the file, the size of the modified data is one byte. The size of the modified data can be represented by "size".

When the electronic device modifies the file, the electronic device generates the file modification information. If the file is modified across devices, the electronic device further sends the file modification information to a device to which the file belongs. For example, after modifying a file on a device A, a device B generates file modification information, and sends the file modification information to device A.

FIG. 5C is a schematic diagram of a file modification record used in this application.

An electronic device stores the file modification record of a local file, where the file modification record is used to indicate a modification history of the file.

Refer to FIG. 5C. In an embodiment of this application, the electronic device generates file modification records according to N pieces of latest file modification information of a local file. Each record corresponds to one piece of file modification information, and indicates one modification to the file. N is a natural number, and a value of N may be set according to a requirement, for example, the value is 10. In an embodiment of this application, the file modification records may include file modification tags after modification (for example, New Tag 1, New Tag 2, . . . , and New Tag N in the figure), modification location information (for example, offset 1, offset 2, . . . , and offset N in the figure), and modified parts (for example, data 1, data 2, . . . , and data N in the figure). In another embodiment of this application, the file modification record may include a file modification tag after modification, modification location information, and a size of modified data.

The electronic device determines a file modification tag after modification (for example, New Tag N in the figure) in the last record in the file modification records as the file modification tag in the metadata of the file.

Figure 6:
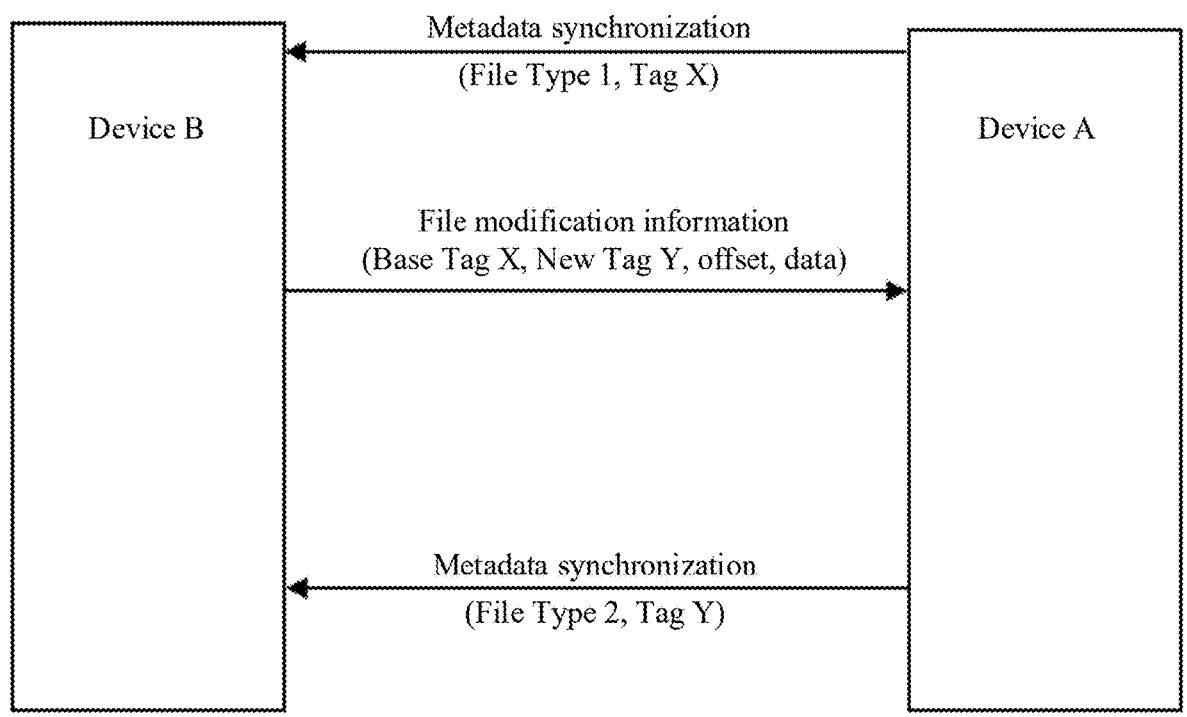
FIG. 6 is a schematic diagram of modifying a file across devices in a distributed file access method according to this application.

FIG. 6 is a schematic diagram of modifying a file across devices in a distributed file access method according to this application. In the figure, an example in which a device B modifies a file on a device A is used for description.

Before the device B modifies the file on the device A, the device A synchronizes metadata of the file to the device B, where the metadata includes a file modification type (represented as File Type 1 in the figure) and a file modification tag (represented as Tag X in the figure).

After the device B modifies the file, the device B sends file modification information to the device A. As shown in the figure, the file modification information sent by the device B to the device A is (Base Tag X, New Tag Y, offset, data), where "Base Tag X" is a file modification tag before modification, that is, a file modification tag synchronized from the device A to the device B; "New Tag Y" is a file modification tag after modification, including a device ID of the device B and a timestamp of modifying the file by device B; "offset" is modification location information (a modification location offset); and "data" is a modified part.

After receiving the file modification information, the device A updates the file modification record of the file according to the file modification information, modifies the locally stored file according to the modification location information and the modified part in the file modification information, modifies the locally stored file modification type and file modification tag according to the file modification type, the file modification tag before modification, and the file modification tag after modification in the file modification information, and synchronizes the file modification type and file modification tag after modification (for example, File Type 2, Tag Y) to the device B.

FIG. 7 shows policies for reading a file across devices and related analysis in a distributed file access method according to this application.

For a file of a terminalless write type, an electronic device downloads the file from a remote device and caches the file locally, and reads the file from a cache. If a size of the file is less than or equal to a preset size (that is, a small file), the entire file may be cached; or if the size of the file is greater than the preset size (that is, a large file, for example, a media file), a part of the file may be cached (that is, block-based caching). The electronic device only needs to check the file modification type of the file (that is, check the File Type field) in the locally stored metadata, to determine whether the file is of the terminalless write type.

For a file of the single-terminal write type, the electronic device caches the file from the remote device locally, and reads the file from the cache. In addition to checking the file modification type of the file in the locally stored metadata, so as to determine whether the file is of the single-terminal write type, the electronic device further checks the file modification tag of the file in the locally stored metadata. If the device ID in the file modification tag is not the ID of the electronic device, the electronic device requests the file modification record from the remote device, and updates, according to the file modification record, the locally cached file to ensure consistency with the file on the remote device.

For a file of the occasional multi-terminal write type, the electronic device caches the file from the remote device locally, and reads the file from the cache. In addition to checking the file modification type of the file in the locally stored metadata, the electronic device further checks the file modification tag of the file in the locally stored metadata. If the device ID in the file modification tag is not the ID of the electronic device, the electronic device requests the file modification record from the remote device, and updates, according to the file modification record, the locally cached file to ensure consistency with the file on the remote device.

For a file of the frequent multi-terminal write type, the electronic device does not cache the file, and reads the file from the remote device.

It should be noted that, when the electronic device reads a file of the terminalless write type, the single-terminal write type, or the occasional multi-terminal write type across devices, the electronic device first determines whether a required file/data block exists in the cache; and if the required file/data block does not exist in the cache, the electronic device downloads the corresponding file/data block from the remote device, and caches the file/data block locally. The electronic device may keep the cached file until the file cache space exceeds a preset threshold or the file is aged due to timeout.

That the electronic device further needs to check the file modification tag of the file from the locally stored metadata when the electronic device reads a file of the single-terminal write type or the occasional multi-terminal write type across devices means that when a required file/data block exists in the cache, the electronic device needs to check the file modification tag of the file from the locally stored metadata. If the required file/data block does not exist in the cache, the electronic device only needs to download the corresponding file/data block from the remote device, and cache the file/data block locally for reading.

Figure 13A:
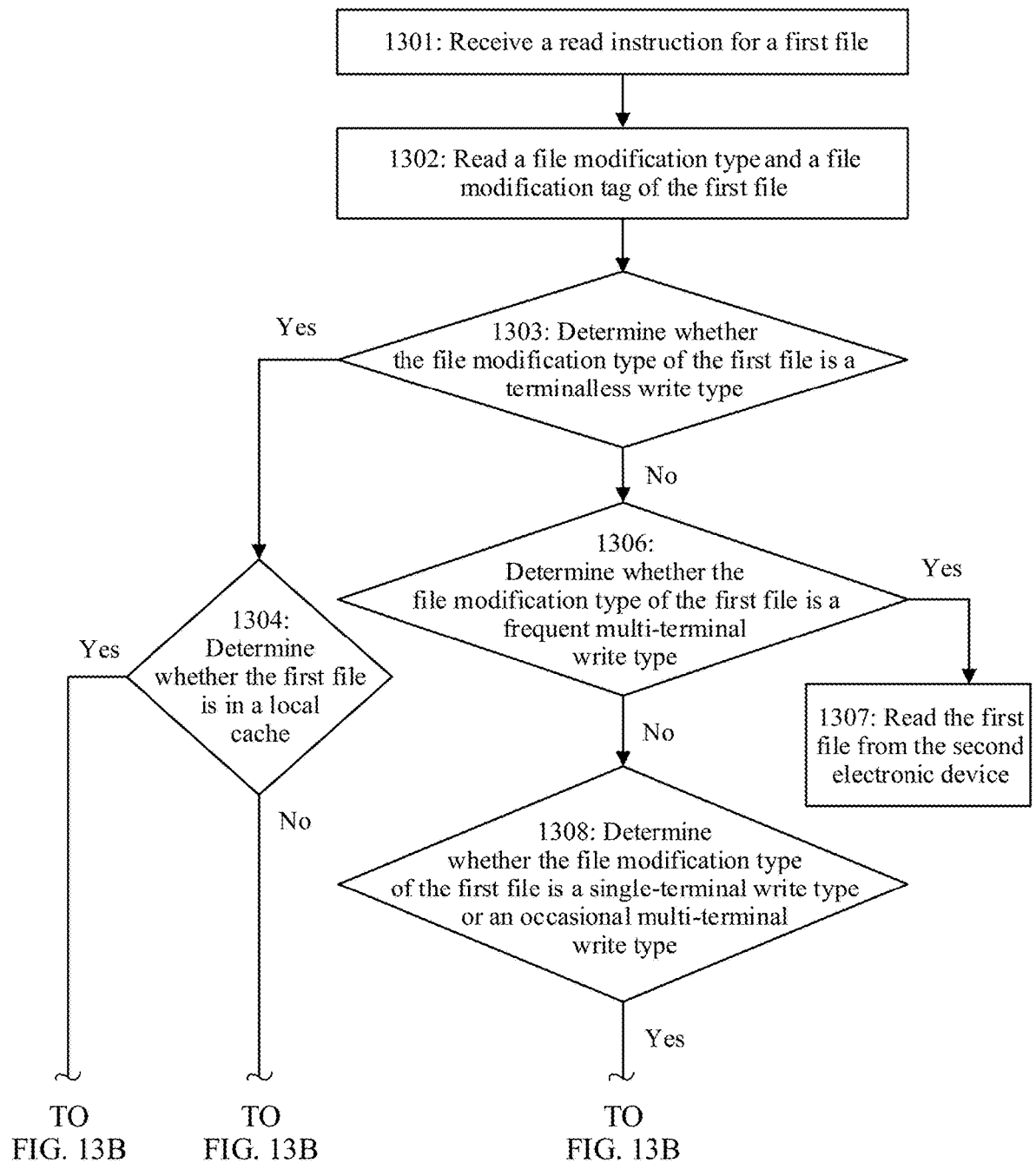
FIG. 13A-FIG. 13B are a flowchart of reading, by a first electronic device, a file on a second electronic device in a distributed file access method according to this application.
Figure 13B:
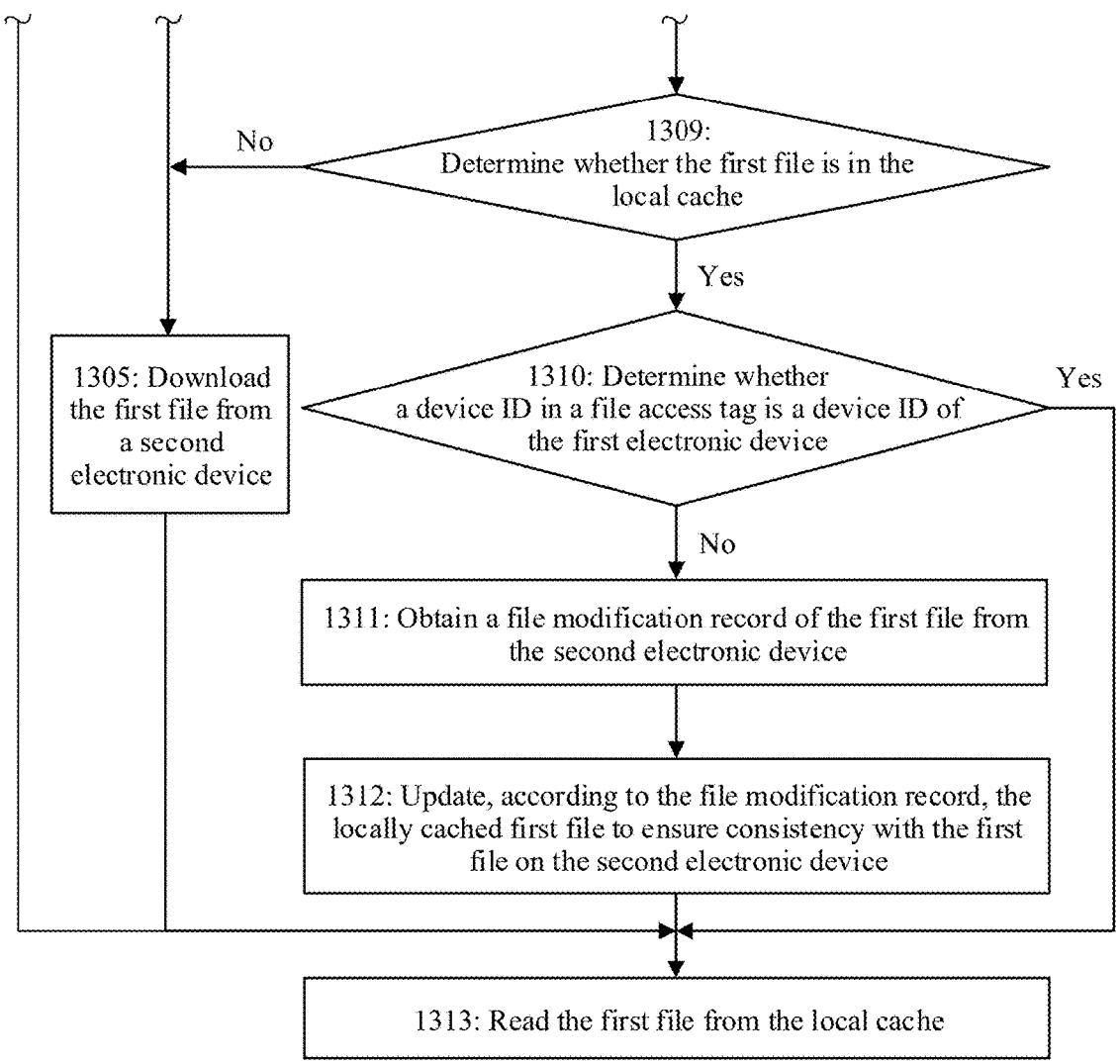

For more details about reading a file across devices, refer to FIG. 13A-FIG. 13B.

FIG. 7 also compares information such as a scenario frequency and performance of different file modification types. For details, refer to the figure.

Figure 8:
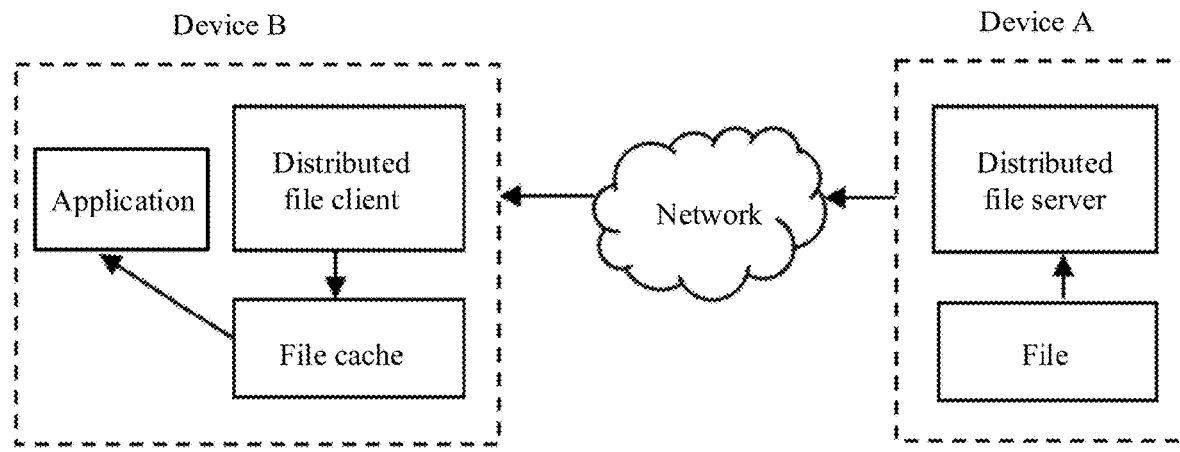
FIG. 8 is a schematic diagram of reading a file of a terminalless write type across devices in a distributed file access method according to this application.

FIG. 8 is a schematic diagram of reading a file of a terminalless write type across devices in a distributed file access method according to this application. For a remote file (a file on a device A) of the terminalless write type, the electronic device (a device B) reads the file through a local cache.

It can be learned from FIG. 8 that the device B reads the file of the terminalless write type on the device A by using a distributed file client on the device B and a distributed file server on the device A. For more details about reading the file of the terminalless write type across devices, refer to FIG. 13A-FIG. 13B and related descriptions.

It should be noted that FIG. 8 only shows that the device B reads a file of the terminalless write type on the device A. It should be understood that the device B may modify/write a file of the terminalless write type on the device A.

Figure 9:
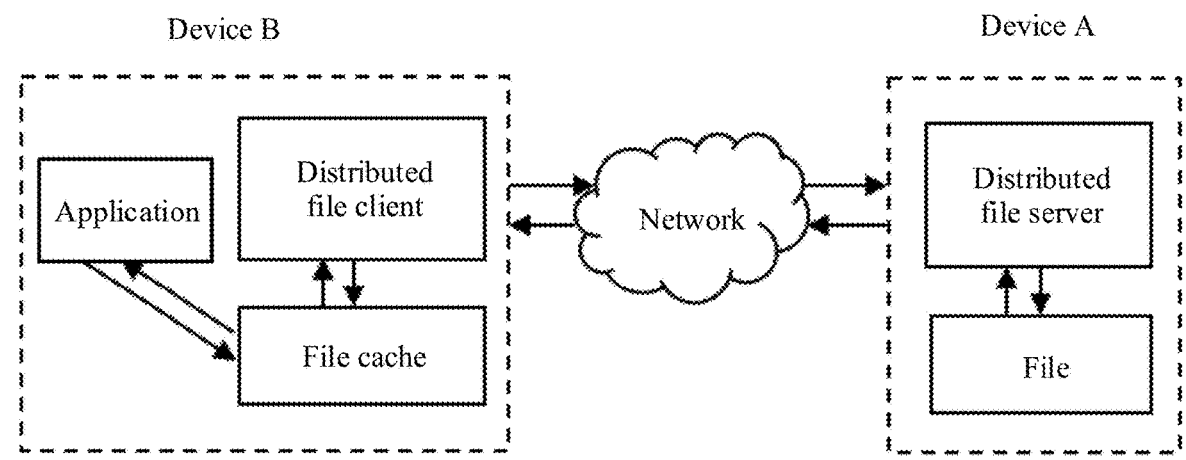
FIG. 9 is a schematic diagram of reading and writing a file of a single-terminal write type across devices in a distributed file access method according to this application.

FIG. 9 is a schematic diagram of reading and writing a file of a single-terminal write type across devices in a distributed file access method according to this application. For a remote file (a file on a device A) of the single-terminal write type, the electronic device (a device B) reads and writes the file through a local cache.

It can be learned from FIG. 9 that the device B reads and writes a file of the single-terminal write type on the device A by using a distributed file client on the device B and a distributed file server on the device A. FIG. 9 shows that the device B reads a file of the single-terminal write type on the device A through a local cache. For more details, refer to FIG. 13A-FIG. 13B, FIG. 15, and related descriptions.

Figure 10:
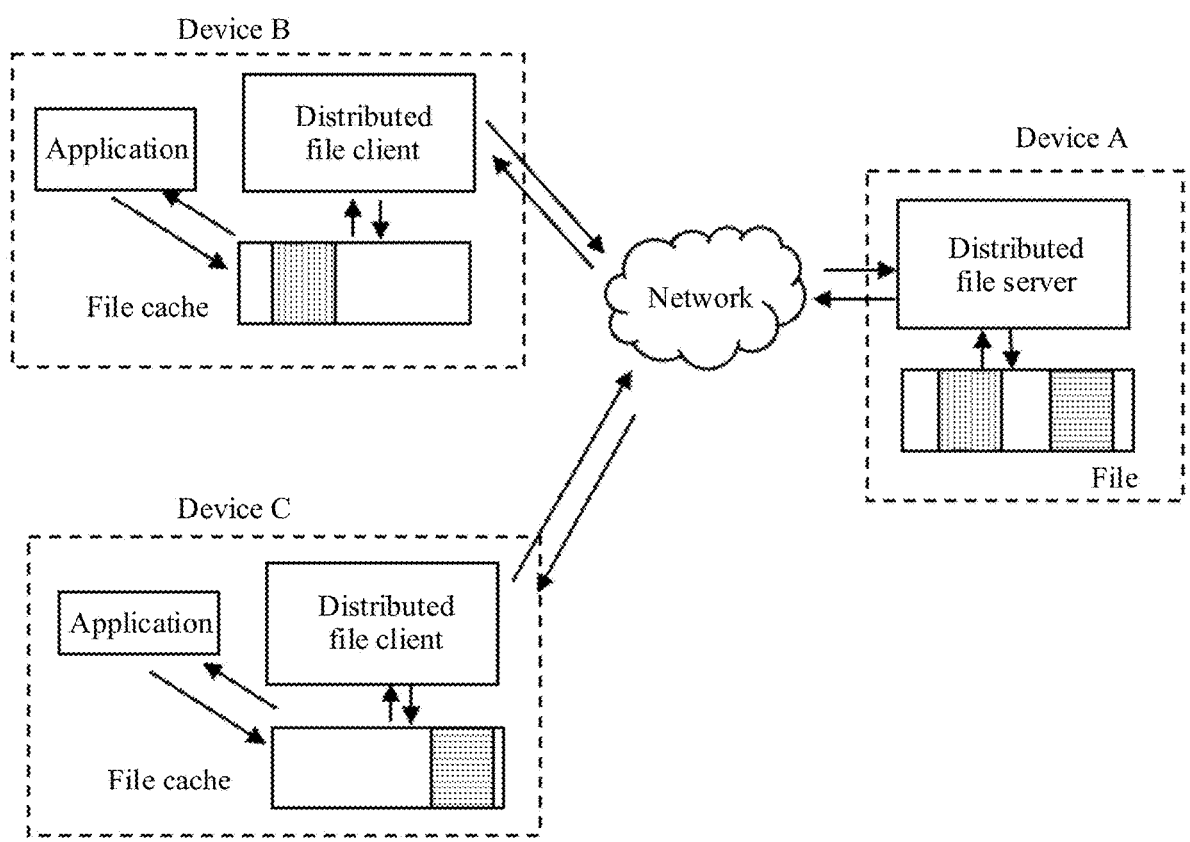
FIG. 10 and FIG. 11 are schematic diagrams of reading and writing a file of an occasional multi-terminal write type across devices in a distributed file access method according to this application.
Figure 11:
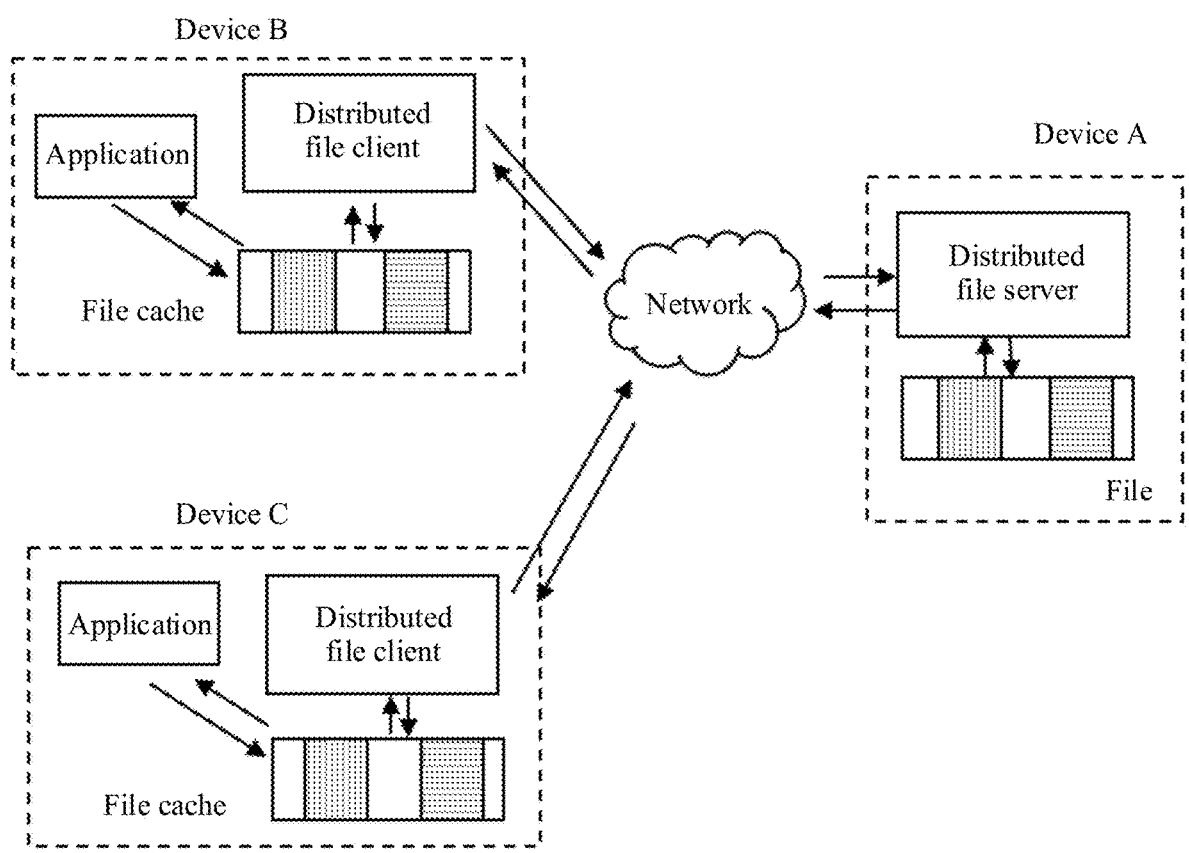

FIG. 10 and FIG. 11 are schematic diagrams of reading and writing a file of an occasional multi-terminal write type across devices in a distributed file access method according to this application. FIG. 10 shows cached data that is modified when a write conflict exists, and FIG. 11 shows cached data that is modified and then read when a write conflict exists.

It can be learned from FIG. 10 and FIG. 11 that a device B reads and writes a file of an occasional multi-terminal write type on a device A by using a distributed file client on the device B and a distributed file server on the device A.

For a remote file (a file on the device A) of the occasional multi-terminal write type, electronic devices (the device B and a device C) read and write the file through a local cache. As shown in FIG. 10, when the device B and a device C modify files on the device A and a write conflict exists, the device B caches the files modified by the device B, and the device C caches the files modified by the device C. As shown in FIG. 11, when the device B and the device C read files after modifying the files on the device A (a write conflict exists), the device B and the device C update locally cached files, so that the locally cached files are consistent with the files on the device A.

A write conflict occurs when a plurality of devices (for example, the device B and the device C) modify a same remote file (for example, a file on the device A): Another device modifies the file while the file is being modified by a device. As a result, the file cached on the device is inconsistent with the remote file. In this application, a file modification tag is used to detect whether a write conflict exists.

It should be noted that the device B and the device C may modify the file on the device A at the same location (including partially the same location), or may modify the file on the device A at different locations. The figure shows a case in which the modification locations are different. For a case in which the modification locations are the same and a case in which the modification locations are different, the processing procedures of the device A, the device B, and the device C are the same. For more details about reading and writing a file of the occasional multi-terminal write type across devices, refer to FIG. 13A-FIG. 13B, FIG. 15, and related descriptions.

Figure 12:
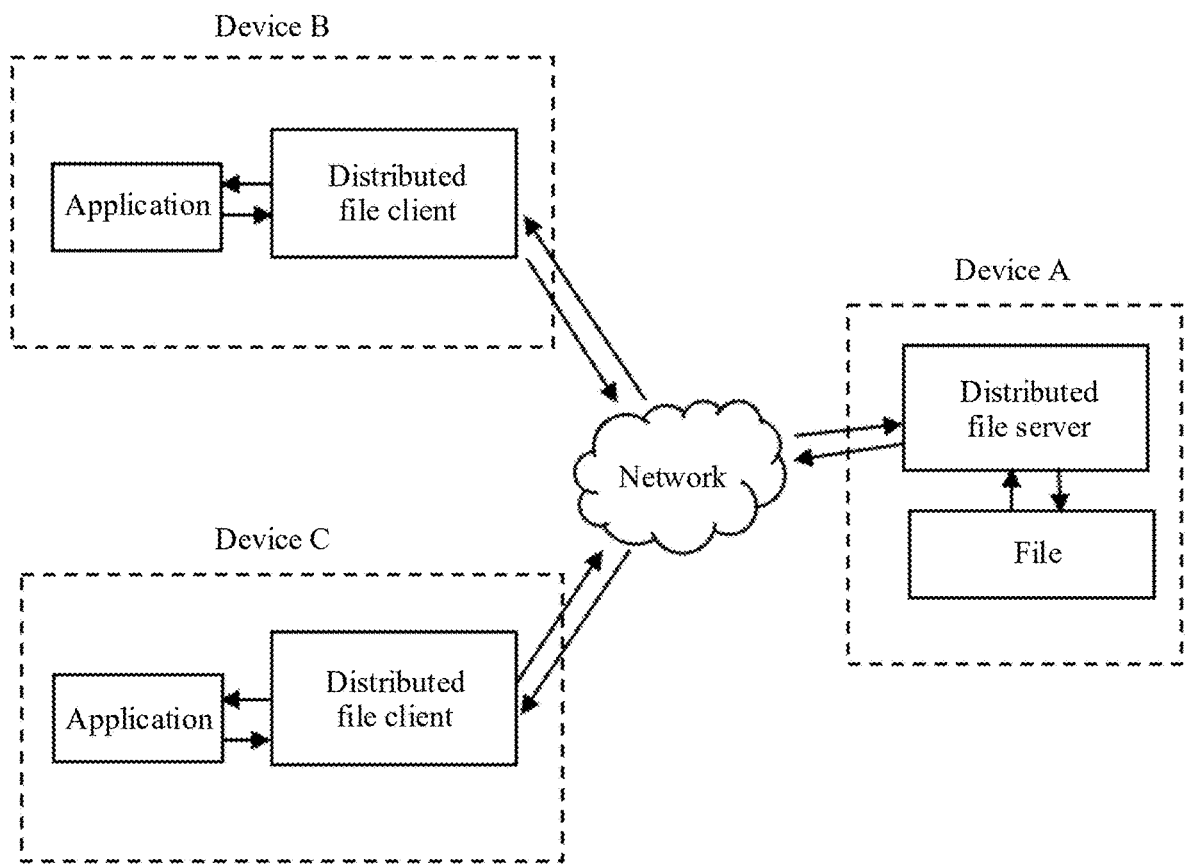
FIG. 12 is a schematic diagram of reading and writing a file of a frequent multi-terminal write type across devices in a distributed file access method according to this application.

FIG. 12 is a schematic diagram of reading and writing a file of a frequent multi-terminal write type across devices in a distributed file access method according to this application. For a remote file (for example, a file on a device A in the figure) of the frequent multi-terminal write type, an electronic device (for example, a device B and a device C in the figure) does not cache the file locally, and reads and writes the file from a remote device (for example, the device A in the figure) each time.

It can be learned from FIG. 12 that the device B reads and writes a file of the frequent multi-terminal write type on the device A by using a distributed file client on the device B and a distributed file server on the device A.

The following uses the first electronic device and the second electronic device as an example to describe how an electronic device performs efficient file access in the distributed file access method according to this application. The first electronic device stores a second file, metadata of the second file, and a file modification record of the second file. The second electronic device stores a first file, metadata of the first file, and a file modification record of the first file. The first electronic device further stores the metadata that is of the first file and that is synchronized from the second electronic device. The second electronic device further stores the metadata that is of the second file and that is synchronized from the first electronic device. The metadata includes a file modification type and a file modification tag.

The first electronic device and the second electronic device may synchronize metadata with each other when being connected for the first time. That is, the first electronic device synchronizes metadata of local files (including the second file) to the second electronic device, and the second electronic device synchronizes metadata of local files (including the first file) to the first electronic device.

Alternatively, the first electronic device may send a metadata synchronization request to the second electronic device. After receiving the metadata synchronization request, the second electronic device synchronizes the metadata of the local files of the second electronic device to the first electronic device. Similarly, the second electronic device may send a metadata synchronization request to the first electronic device. After receiving the metadata synchronization request, the first electronic device synchronizes the metadata of the local files of the first electronic device to the second electronic device.

FIG. 13A-FIG. 13B are a flowchart of reading, by a first electronic device (for example, a device B), a first file on a second electronic device (for example, a device A) (that is, reading the file across devices) in a distributed file access method according to this application.

1301: The first electronic device receives a read instruction for the first file.

A distributed file directory may be displayed on the first electronic device, files of each electronic device (for example, the electronic device 10 shown in FIG. 1) are displayed in the distributed file directory, and a user clicks the first file of the second electronic device from the distributed file directory, so as to send a read instruction for the first file.

Alternatively, the first electronic device (for example, the device B) may receive a read instruction of another electronic device (for example, a device C) for the first file (for example, a file on the device A).

1302: The first electronic device reads a file modification type and a file modification tag of the first file that are stored in the first electronic device.

In an embodiment of this application, the first electronic device may be provided with a distributed database, and metadata of a local file and metadata of a remote file are stored in the distributed database. The first electronic device reads the metadata of the first file from the distributed database, and reads the file modification type of the first file from the metadata of the first file.

1303: The first electronic device determines whether the file modification type of the first file is a terminalless write type.

1304: If the file modification type of the first file is the terminalless write type, the first electronic device determines whether the first file is in a local cache.

If the first file is in the local cache, step 1313 is performed.

1305: If the first file is not in the local cache, the first electronic device downloads the first file from the second electronic device and caches the first file locally, and then performs step 1313.

1306: If the file modification type of the first file is not the terminalless write type, the first electronic device determines whether the file modification type of the first file is a frequent multi-terminal write type.

1307: If the file modification type of the first file is the frequent multi-terminal write type, the first electronic device reads the first file from the second electronic device. The first electronic device may send a file read request to the second electronic device, so as to read the first file on the second electronic device. After receiving the file read request, the second electronic device sends the first file to the first electronic device.

1308: If the file modification type of the first file is not the frequent multi-terminal write type, the first electronic device determines whether the file modification type of the first file is a single-terminal write type or an occasional multi-terminal write type.

If the file modification type of the first file is not the single-terminal write type or the occasional multi-terminal write type, it indicates that the file modification type of the first file is incorrect, and the procedure ends.

1309: If the file modification type of the first file is the single-terminal write type or the occasional multi-terminal write type, the first electronic device determines whether the first file is in the local cache.

If the first file is not in the local cache, 1305 and 1313 are performed.

1310: If the first file is in the local cache, the first electronic device determines whether a device ID in the file modification tag of the first file is a device ID of the first electronic device. If the device ID in the file modification tag of the first file is the device ID of the first electronic device, 1313 is performed.

1311: If the device ID in the file modification tag of the first file is not the device ID of the first electronic device, the first electronic device obtains a file modification record of the first file from the second electronic device.

The first electronic device may send a modification record obtaining request to the second electronic device, and receive the file modification record of the first file returned by the second electronic device.

1312: The first electronic device updates, according to the file modification record, the locally cached first file to ensure consistency with the first file on the second electronic device.

In an embodiment of this application, the file modification record includes modification location information and a modified part, and the first electronic device updates, according to the modification location information (for example, a modification location offset), the modified part to the first file locally cached by the first electronic device. For example, if the first file locally cached by the first electronic device is "123456799", the modification location offset in the file modification record is 0, and the modified part is "55", the first electronic device updates the locally cached first file to "553456799".

In another embodiment of this application, the file modification record includes modification location information and a size of modified data. The first electronic device obtains a modified part from the second electronic device according to the modification location information (for example, a modification location offset) and the size of modified data in the file modification record, and updates the locally cached first file according to the modified part obtained from the second electronic device. For example, if the first file locally cached by the first electronic device is "123456799", the modification location offset in the file modification record is 0, and the size of the modified data is 2 (indicating that two digits are changed), the first electronic device obtains the modified part "55" from the second electronic device, and updates the locally cached first file to "553456799".

1313: The first electronic device reads the first file from the local cache.

It should be understood that, in the embodiment described in FIG. 13A-FIG. 13B, the first electronic device sequentially determines whether the file modification type of the first file is the terminalless write type, the single-terminal write type, the occasional multi-terminal write type, and the frequent multi-terminal write type. In another embodiment of this application, a sequence of determining the file modification type of the first file may be changed. For example, it may be sequentially determined whether the file modification type of the first file is the frequent multi-terminal write type, the occasional multi-terminal write type, the single-terminal write type, or the terminalless write type. Alternatively, in one step, it may be directly determined that the file modification type of the first file is one of the following: the terminalless write type, the single-terminal write type, the occasional multi-terminal write type, and the frequent multi-terminal write type; and corresponding processing is performed according to a determining result.

It should be noted that, in 1301, if the first electronic device (for example, the device B) receives the read instruction of another electronic device (for example, the device C) for the first file (for example, the file on the device A), the first electronic device reads the first file from the local cache, and then sends the first file to the another electronic device.

In the embodiment shown in FIG. 13A-FIG. 13B, when reading a file across devices, the electronic device obtains the file modification type and the file modification tag of the file, and reads the file according to the file modification type and the file modification tag. The electronic device may adopt different read policies for different file modification types and file modification tags, thereby improving performance of distributed file access.

For a remote file of the terminalless write type, the single-terminal write type, or the occasional multi-terminal write type, in this embodiment of this application, the remote file is cached locally and then read, thereby improving file reading efficiency.

Figure 14:
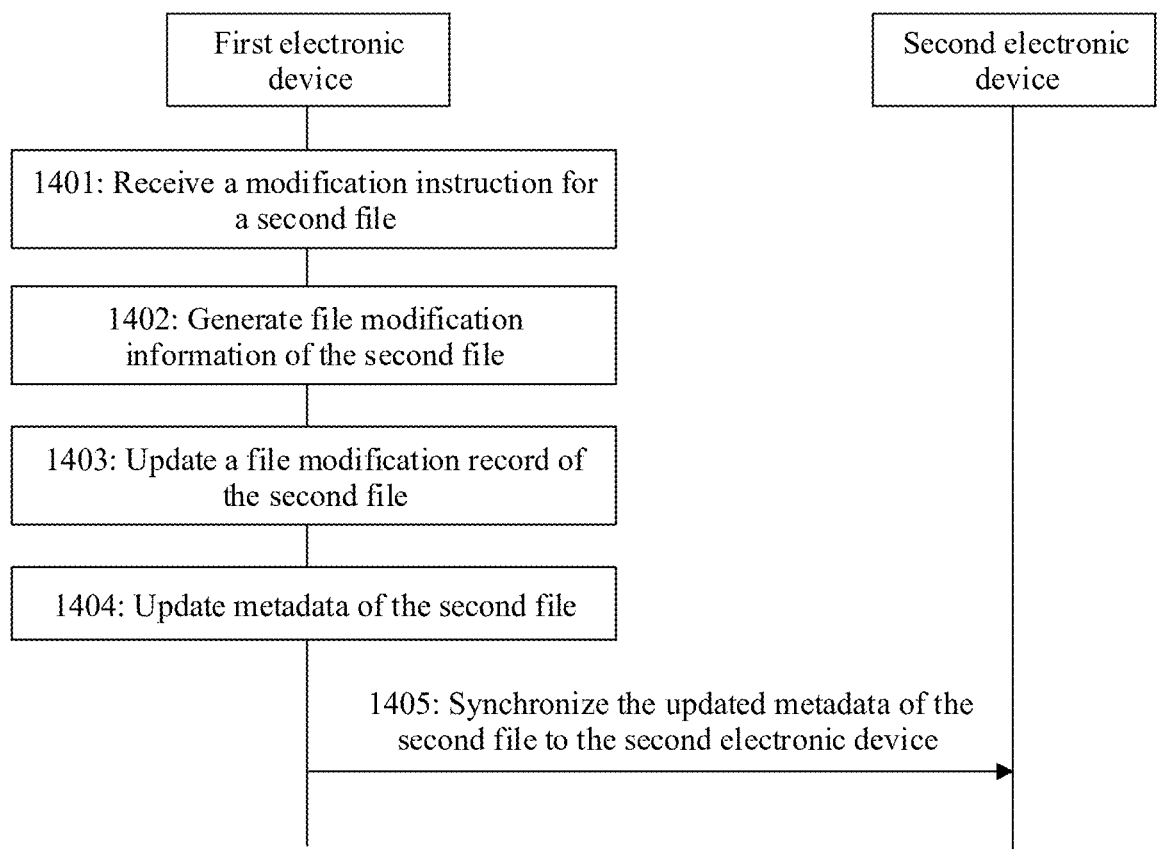
FIG. 14 is a flowchart of modifying, by a first electronic device, a second file on the first electronic device in a distributed file access method according to this application.

FIG. 14 is a flowchart of modifying, by a first electronic device, a second file on the first electronic device in a distributed file access method according to this application.

1401: The first electronic device receives a modification instruction for a second file.

A distributed file directory may be displayed on the first electronic device, and files of each electronic device in a distributed network are displayed in the distributed file directory. A user opens the second file from the distributed file directory to modify the second file, so as to send a modification instruction for the second file.

Alternatively, the first electronic device (for example, a device B) may receive a modification instruction of another electronic device (for example, a device C) for the second file.

1402: The first electronic device generates file modification information of the second file.

The generated file modification information may include a file modification tag before modification, a file modification tag after modification, modification location information (for example, a modification location offset), and a modified part.

For example, the first electronic device generates the file modification information (Base Tag (N+1), New Tag (N+1), offset (N+1), data (N+1)). "Base Tag (N+1)" is the file modification tag before modification; "New Tag (N+1)" is the file modification tag after modification; "offset (N+1)" is the modification location offset; and "data (N+1)" is the modified part.

1403: The first electronic device updates a file modification record of the second file according to the file modification information of the second file.

For example, the file modification record includes the file modification tag after modification, the modification location information, and the modified part. The file modification record of the second file before update is shown in FIG. 5C. The first electronic device adds (New Tag (N+1), offset (N+1), data (N+1)) to the file modification record of the second file before update, to obtain the updated file modification record of the second file.

1404: The first electronic device updates a file modification type and the file modification tag in metadata of the second file according to the file modification information of the second file and the updated file modification record of the second file.

Figure 16A:
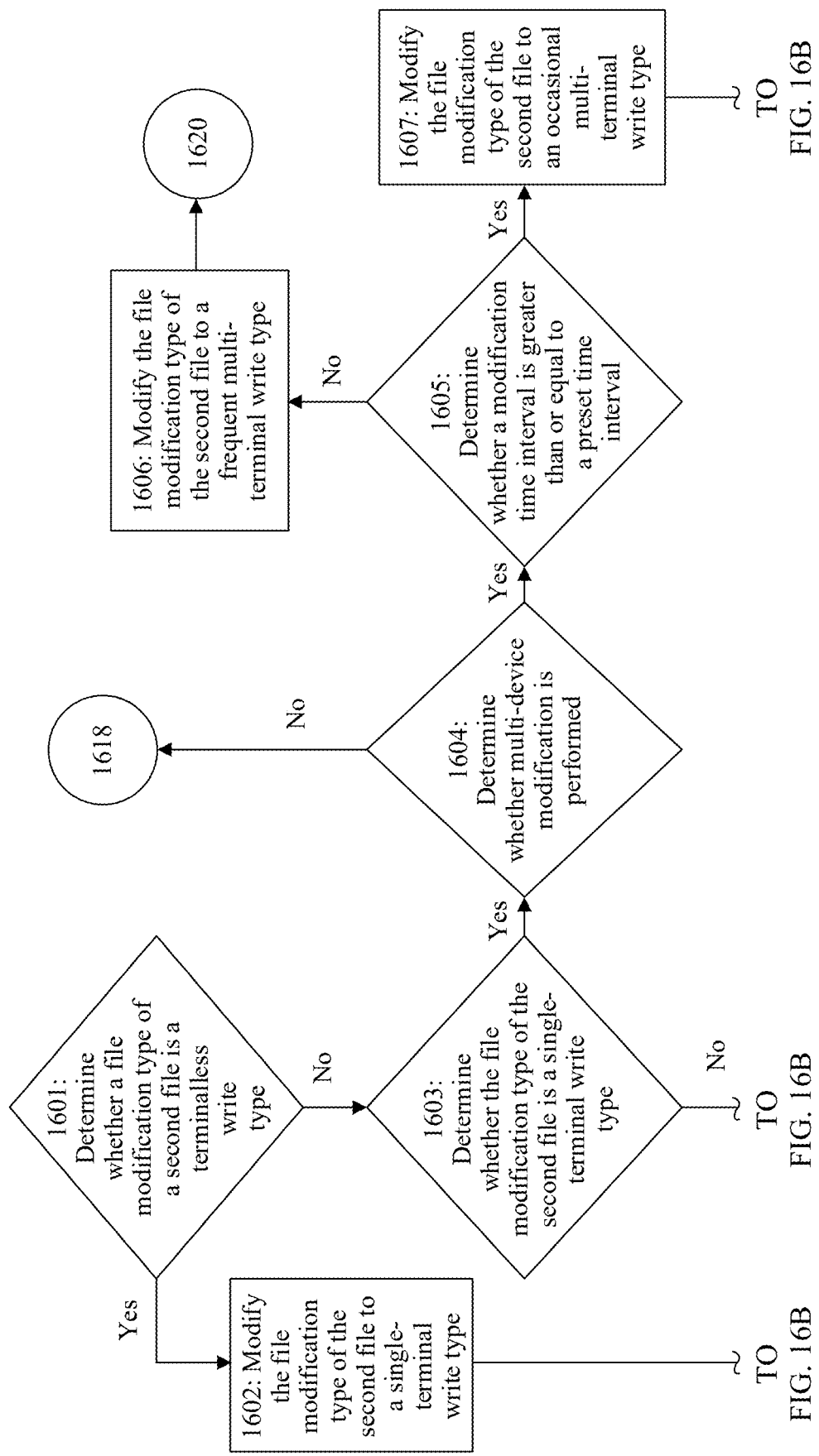
FIG. 16A-FIG. 16C are a detailed flowchart of updating, by a first electronic device, a file modification type and a file modification tag in metadata of a second file according to file modification information of a second file and an updated file modification record of the second file (that is, 1404 in FIG. 14) in a distributed file access method according to this application.
Figure 16B:
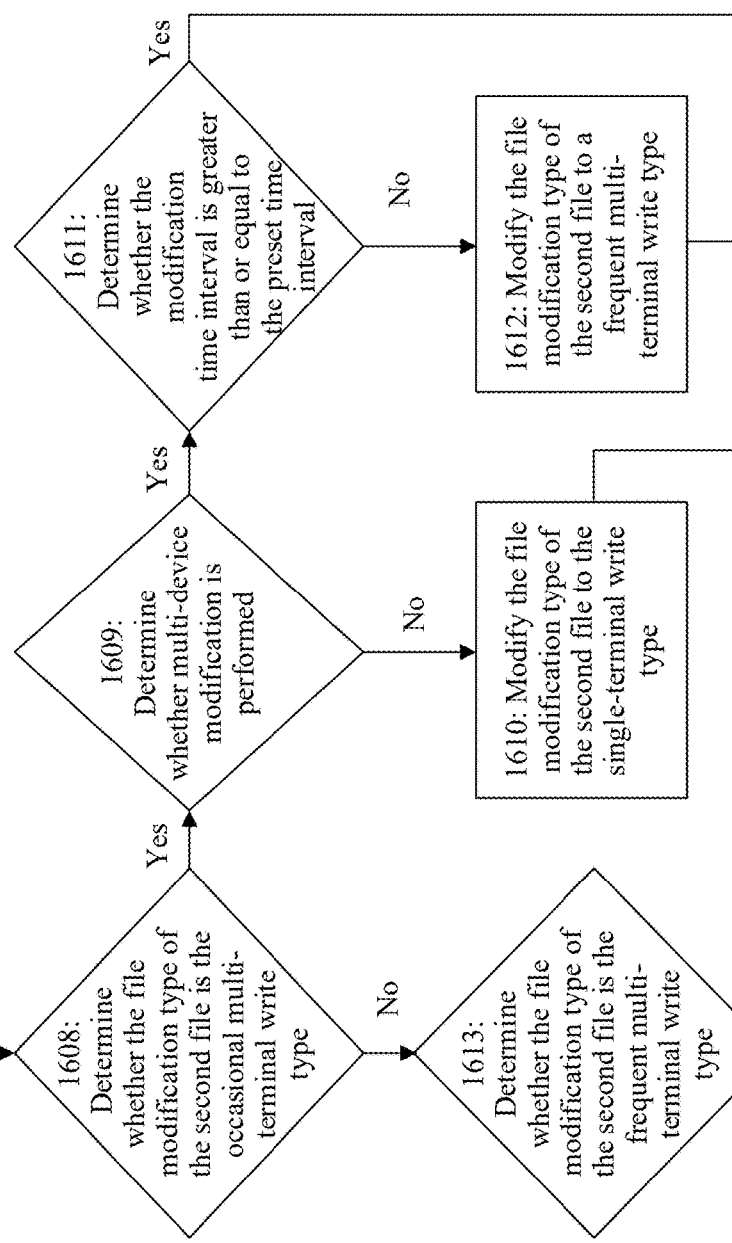
Figure 16C:
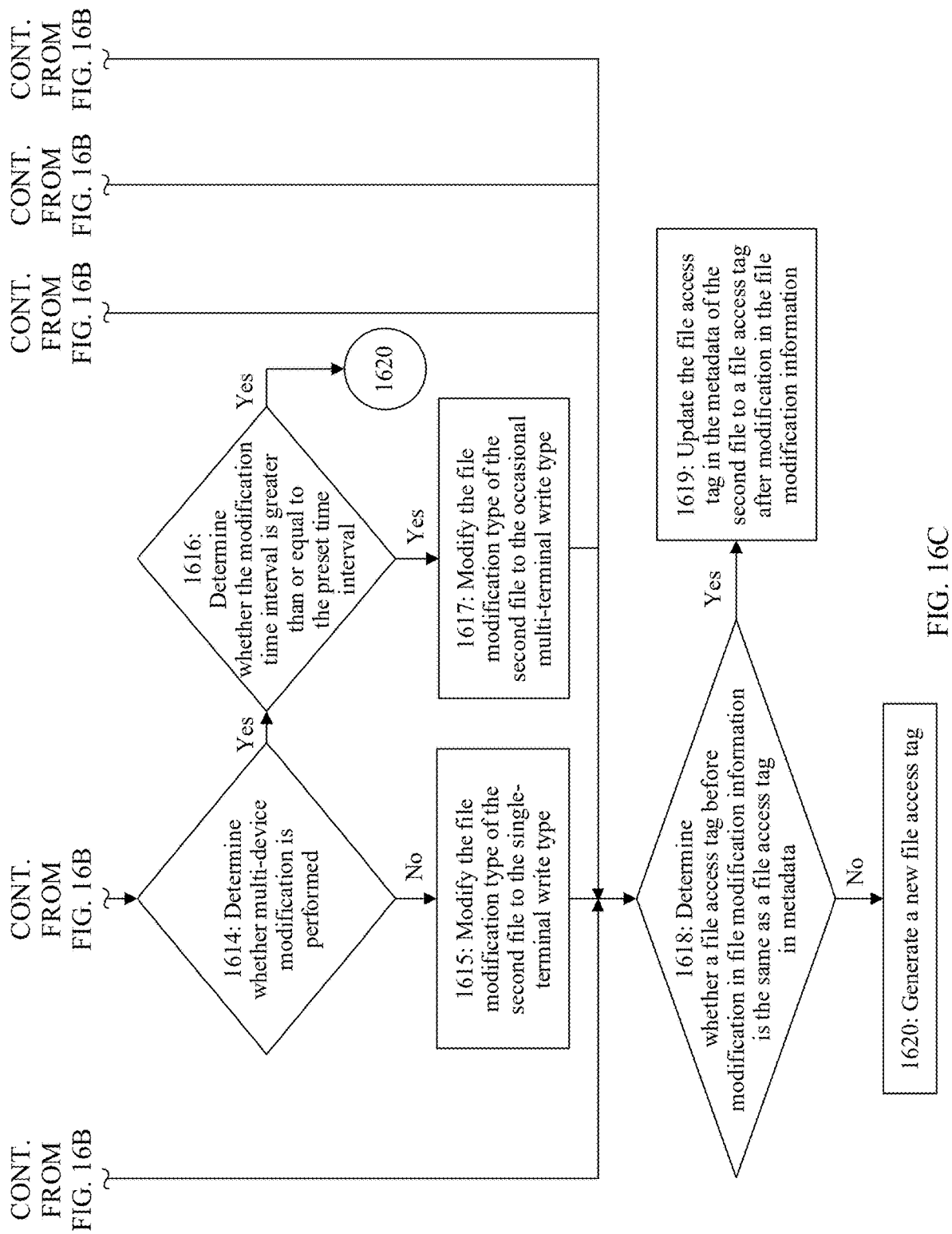

For a specific process in which the first electronic device updates the file modification type and the file modification tag in the metadata of the second file according to the file modification information of the second file and the updated file modification record of the second file, refer to FIG. 16A-FIG. 16C.

1405: The first electronic device synchronizes the updated metadata of the second file to the second electronic device.

The first electronic device may synchronize the updated metadata of the second file to each electronic device in the distributed network.

Figure 15:
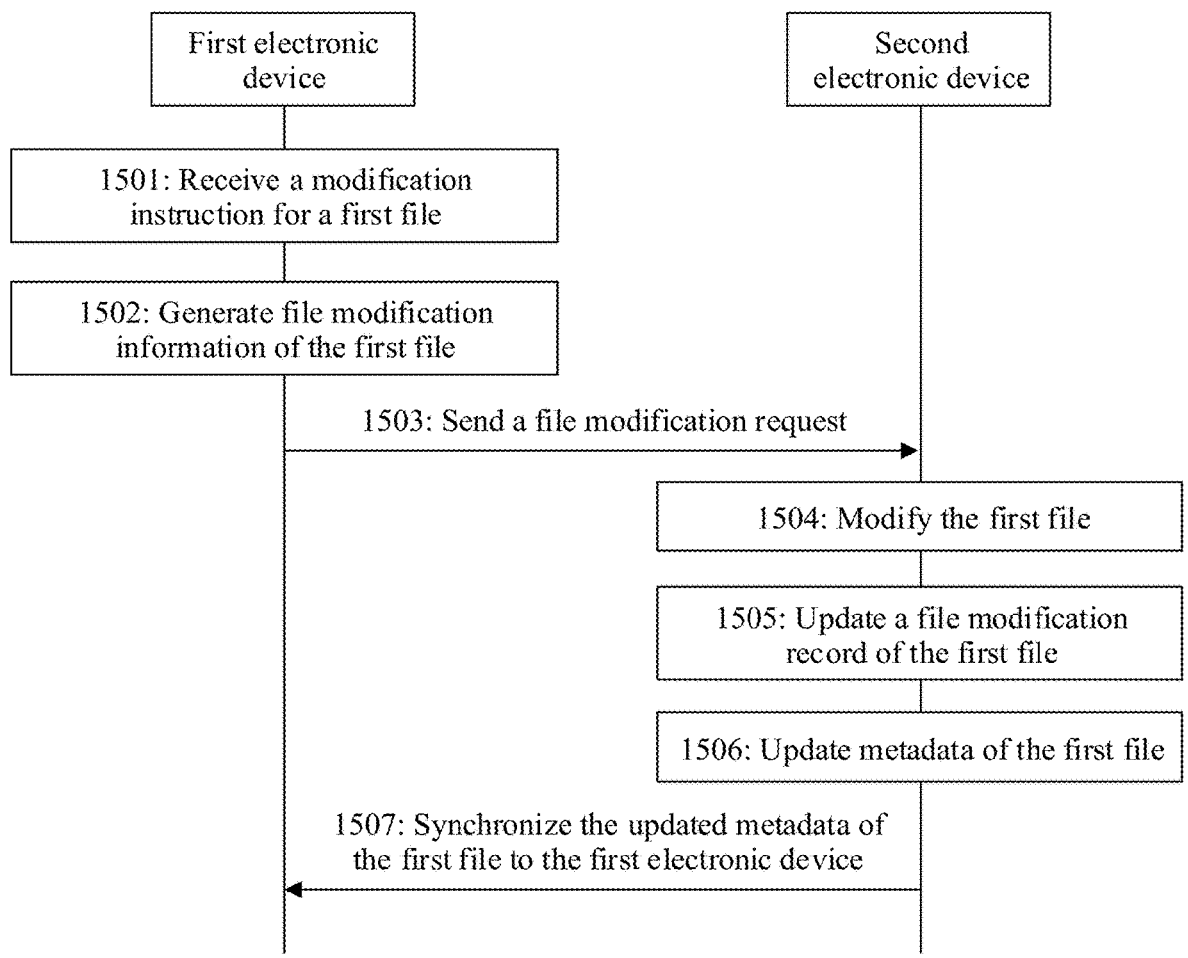
FIG. 15 is a flowchart of modifying, by a first electronic device, a first file on a second electronic device in a distributed file access method according to this application.

FIG. 15 is a flowchart of modifying, by a first electronic device, a first file on a second electronic device in a distributed file access method according to this application.

1501: The first electronic device receives a modification instruction for the first file.

A distributed file directory may be displayed on the first electronic device, and files of each electronic device in a distributed network are displayed in the distributed file directory. A user opens the first file from the distributed file directory to modify the first file, so as to send a modification instruction for the first file.

Alternatively, the first electronic device (for example, the device B) may receive a read instruction of another electronic device (for example, a device C) for the first file (for example, a file on the device A).

1502: The first electronic device generates file modification information of the first file.

1503: The first electronic device sends a file modification request to the second electronic device, where the file modification request carries the file modification information that is of the first file and that is generated by the first electronic device.

1504: The second electronic device modifies the locally stored first file according to the file modification information in the file modification request.

1505: The second electronic device updates a file modification record of the first file according to the file modification information in the file modification request.

1506: The second electronic device updates a file modification type and a file modification tag in metadata of the first file according to the file modification information of the first file and the updated file modification record of the first file.

For a specific process in which the second electronic device updates the file modification type and the file modification tag in the metadata of the first file according to the file modification information of the first file and the updated file modification record of the first file, refer to FIG. 16A-FIG. 16C.

1507: The second electronic device synchronizes the updated metadata of the first file to the first electronic device.

The second electronic device may synchronize the updated metadata of the first file to each electronic device in the distributed network.

FIG. 16A-FIG. 16C are a detailed flowchart of updating, by a first electronic device, a file modification type and a file modification tag in metadata of a second file according to file modification information of a second file and an updated file modification record of the second file (that is, 1404 in FIG. 14) in a distributed file access method according to this application. A method for updating, by the second electronic device, the file modification type and the file modification tag (that is, 1506 in FIG. 15) in the metadata of the first file according to the file modification information of the first file and the updated file modification record of the first file is the same as that for updating, by the first electronic device, the file modification type and the file modification tag (that is, 1404 in FIG. 14) in the metadata of the second file according to the file modification information of the second file and the updated file modification record of the second file. Details are not described herein again.

1601: The first electronic device determines whether the file modification type of the second file is a terminalless write type.

1602: If the file modification type of the second file is the terminalless write type, the first electronic device modifies the file modification type of the second file to a single-terminal write type, and then performs 1608.

1603: If the file modification type of the second file is not the terminalless write type, the first electronic device determines whether the file modification type of the second file is the single-terminal write type.

1604: If the file modification type of the second file is the single-terminal write type, the first electronic device determines, according to the updated file modification record of the second file, whether two or more devices modify the second file (that is, multi-device modification) in a fixed time window (for example, 10 minutes before a current time).

1605: If two or more devices modify the second file in the fixed time window, the first electronic device determines whether a time interval between times when the two or more devices modify the second file is greater than or equal to a preset time interval (for example, 10 seconds).

1606: If the time interval between the times when the two or more devices modify the second file is not greater than or equal to (that is, less than) the preset time interval, the first electronic device modifies the file modification type of the second file to a frequent multi-terminal write type, and then performs 1620.

1607: If the time interval between the times when the two or more devices modify the second file is greater than or equal to the preset time interval, the first electronic device modifies the file modification type of the second file to an occasional multi-terminal write type, and then performs step 1618.

1608: If the file modification type of the second file is not the single-terminal write type, the first electronic device determines whether the file modification type of the second file is the occasional multi-terminal write type.

1609: If the file modification type of the second file is the occasional multi-terminal write type, the first electronic device determines, according to the updated file modification record of the second file, whether two or more devices modify the second file (that is, multi-device modification) in the fixed time window.

1610: If no two or more devices modify the second file in the fixed time window, the first electronic device modifies the file modification type of the second file to the single-terminal write type, and then performs 1618.

1611: If two or more devices modify the second file in the fixed time window, the first electronic device determines whether the time interval between the times when the two or more devices modify the second file is greater than or equal to the preset time interval.

If the time interval between the times when the two or more devices modify the second file is not greater than or equal to the preset time interval, 1618 is performed.

1612: If the time interval between the times when the two or more devices modify the second file is not greater than or equal to (that is, less than) the preset time interval, the first electronic device modifies the file modification type of the second file to a frequent multi-terminal write type, and then performs 1620.

1613: If the file modification type of the second file is not the occasional multi-terminal write type, the first electronic device determines whether the file modification type of the second file is the frequent multi-terminal write type.

If the file modification type of the second file is not the frequent multi-terminal write type, it indicates that the file modification type of the second file is incorrect, and the procedure ends.

1614: If the file modification type of the second file is the frequent multi-terminal write type, the first electronic device determines, according to the updated file modification record of the second file, whether two or more devices modify the second file (that is, multi-device modification) in the fixed time window.

1615: If no two or more devices modify the second file in the fixed time window, the first electronic device modifies the file modification type of the second file to the single-terminal write type.

1616: If two or more devices modify the second file in the fixed time window, the first electronic device determines whether the time interval between the times when the two or more devices modify the second file is greater than or equal to the preset time interval, and then performs 1618.

1617: If the time interval between the times when the two or more devices modify the second file is greater than or equal to the preset time interval, the first electronic device modifies the file modification type of the second file to the occasional multi-terminal write type, and then performs step 1618.

1618: The first electronic device determines whether a file modification tag before modification in the file modification information is the same as the file modification tag in the metadata.

1619: If the file modification tag before modification in the file modification information is the same as the file modification tag in the metadata, the first electronic device updates the file modification tag in the metadata of the second file to the file modification tag after modification in the file modification information.

1620: If the file modification tag before modification in the file modification information is different from the file modification tag in the metadata, it indicates that a write conflict exists, and the first electronic device generates a new file modification tag for the second file, and updates the file modification tag in the metadata of the second file to the new file modification tag.

It should be understood that, in the embodiment described in FIG. 16A-FIG. 16C, the first electronic device sequentially determines whether the file modification type of the second file is the terminalless write type, the single-terminal write type, the occasional multi-terminal write type, and the frequent multi-terminal write type. In another embodiment of this application, a sequence of determining the file modification type of the second file may be changed. For example, it may be sequentially determined whether the file modification type of the second file is the frequent multi-terminal write type, the occasional multi-terminal write type, the single-terminal write type, or the terminalless write type. Alternatively, in one step, it may be directly determined that the file modification type of the second file is one of the following: the terminalless write type, the single-terminal write type, the occasional multi-terminal write type, and the frequent multi-terminal write type; and corresponding processing is performed according to a determining result.

In this application, different initial file modification types are selected for different files, and the file modification type is adaptively switched in a scenario in which different files conflict. Compared with a conventional file access method, in scenarios of terminalless write, single-terminal write, and occasional multi-terminal write, the file access method provided in this application has better performance, and performance is improved more significantly in a high-latency network condition. This application reduces one-time instantaneous real-time protocol transmissions of a device. Compared with the proxy mode in the NFS protocol, this application reduces network interaction, and avoids a case in which a write operation is exclusive. In this application, when a network of a single device is unstable, operating performance of another device is not affected.

Figure 17A:
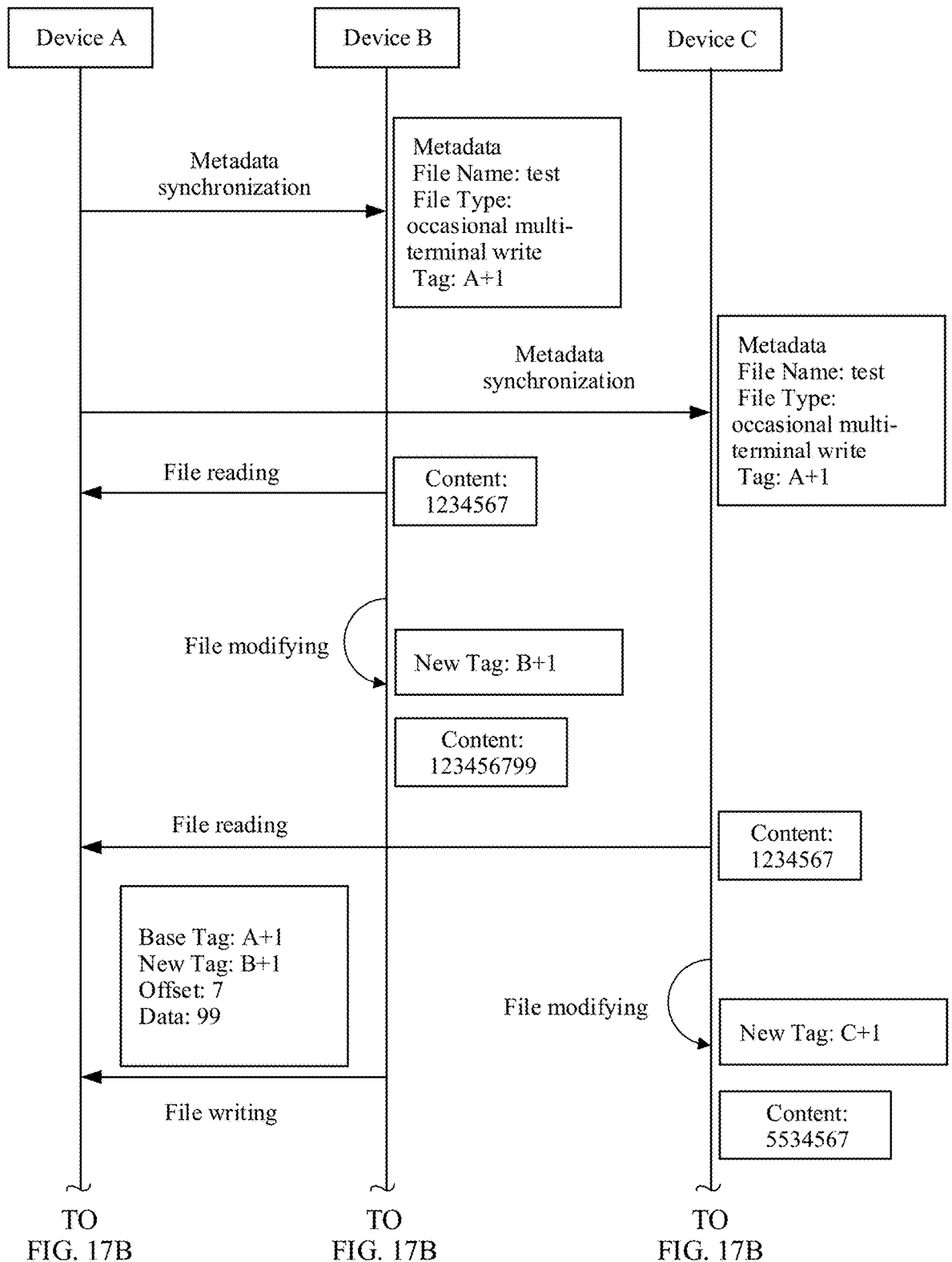
FIG. 17A-FIG. 17B are a schematic diagram of a processing procedure when a write conflict occurs in a distributed file access method according to this application.
Figure 17B:
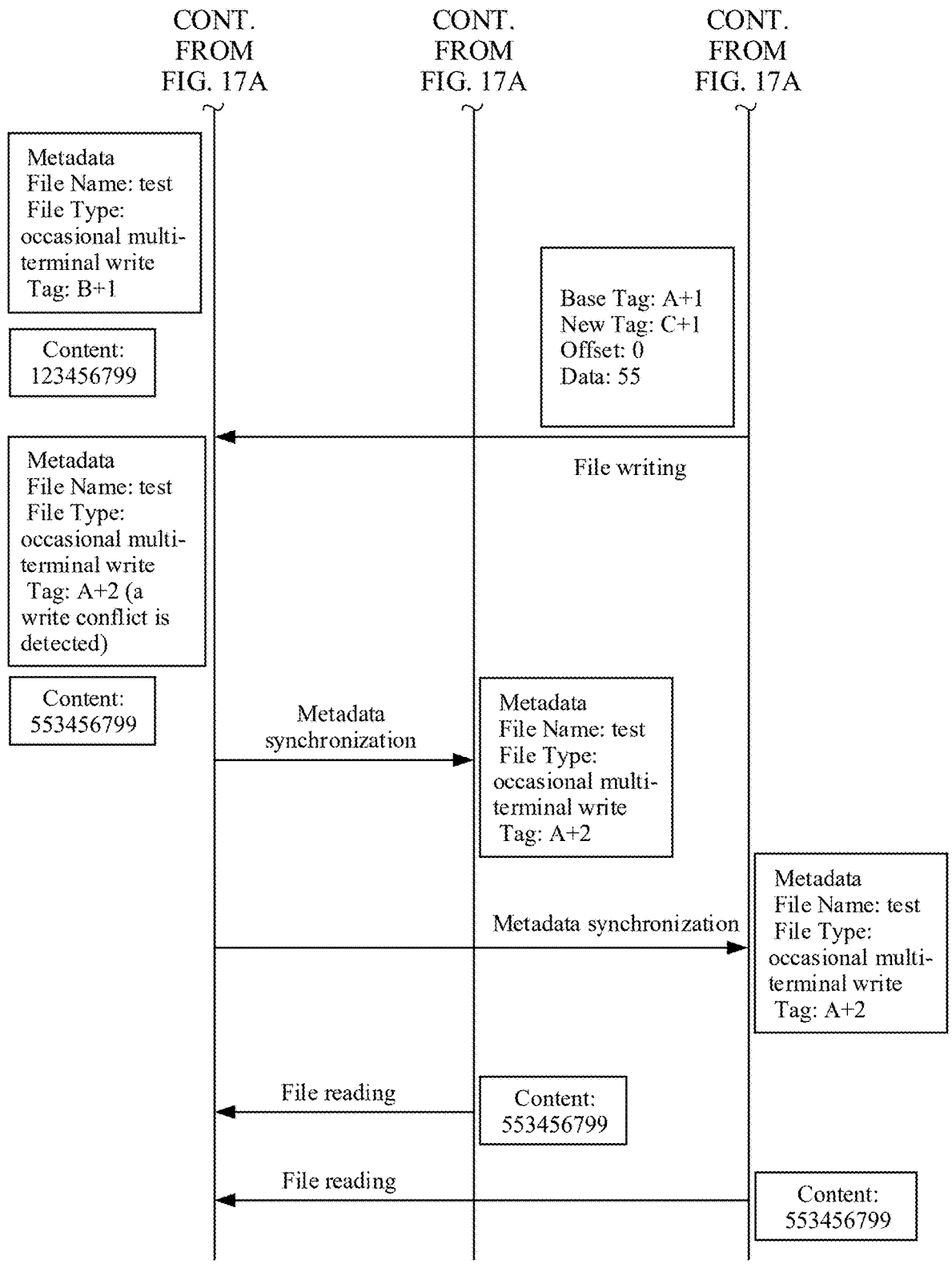

FIG. 17A-FIG. 17B are a schematic diagram of a processing procedure when a write conflict occurs in a distributed file access method according to this application.

As shown in FIG. 17A-FIG. 17B, a device A stores a file whose file name is "test" and file content is "123456", and the device A further stores metadata of the file "test", where a file modification type of the file "test" is occasional multi-terminal write, and a file modification tag is "C+1". The device A synchronizes the metadata of the file "test" to a device B and a device C. The device B reads the file "test" from the device A, and caches the file content "123456" locally. The device B modifies the file content "123456" to "12345699". The device B sends a file modification request (file writing) carrying file modification information to the device A, where a file modification tag before modification is "C+1", a file modification tag after modification is "B+1", modification location information (a modification location offset) is "7", and a modified part is "99". The device A modifies the file modification tag in the metadata to "B+1" and modifies the file content to "12345699" according to the file modification request of the device B. When the device B writes a file to the device A, the device C reads the file "test" from the device A, and caches the file content "123456" locally. The device C modifies the file content "123456" to "553456". The device C sends a file modification request carrying file modification information to the device A, where a file modification tag before modification is "C+1", modification location information (a modification location offset) is 0, a file modification tag after modification is "C+1", and a modified part is "55". After receiving the file modification request from the device C, the device A detects a write conflict, modifies the file modification tag in the metadata to "C+2", and modifies the file content to "55345699". The device A synchronizes the modified metadata to the device B and the device C. The device B and the device C read the file "test" again, and the read file content is "55345699".

Figure 18:
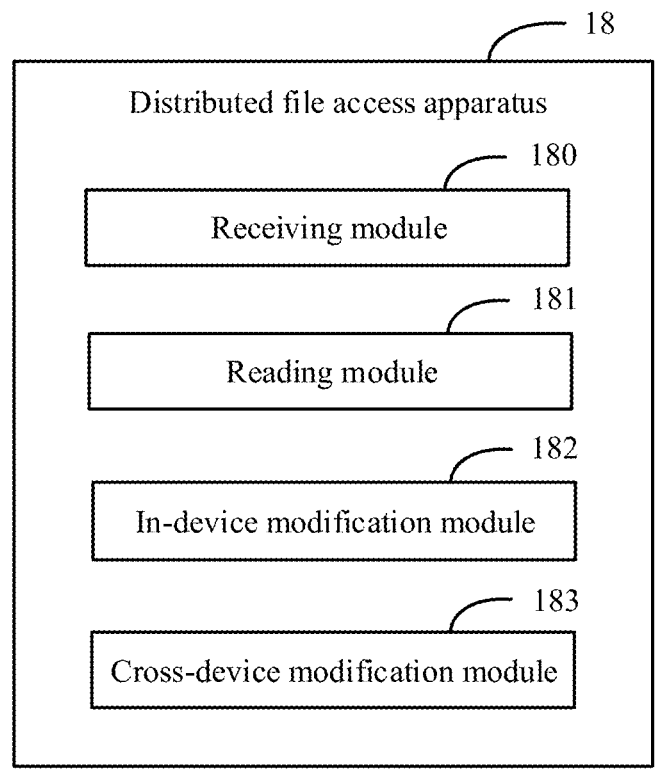
FIG. 18 is a schematic diagram of functional modules of a distributed file access apparatus applied to a first electronic device according to an embodiment of this application.

FIG. 18 is a schematic diagram of functional modules of a distributed file access apparatus 18 according to an embodiment of this application. The distributed file access apparatus 18 is applied to a first electronic device, and the first electronic device is in communication connection to a second electronic device. As shown in FIG. 18, the distributed file access apparatus 18 includes a receiving module 180, a reading module 181, an in-device modification module 182, and a cross-device modification module 183.

The receiving module 180 is configured to receive a read instruction for a first file. The reading module 181 is configured to: read a file modification type and a file modification tag of the first file that are locally stored in the first electronic device, and read the first file according to the read file modification type and the file modification tag.

The in-device modification module 182 is configured to: obtain a modification instruction for a second file; in response to the modification instruction for the second file, modify the second file and update a file modification record of the second file; update a file modification type and a file modification tag in metadata of the second file according to the file modification record of the second file; and synchronize the updated metadata of the second file to the second electronic device.

The cross-device modification module 183 is configured to: obtain a modification instruction for the first file; in response to the modification instruction for the first file, generate file modification information of the first file; and send a file modification request to the second electronic device. The file modification information includes a file modification tag before modification, a file modification tag after modification, modification location information, and a modified part. The file modification request carries the file modification information of the first file.

Figure 19:
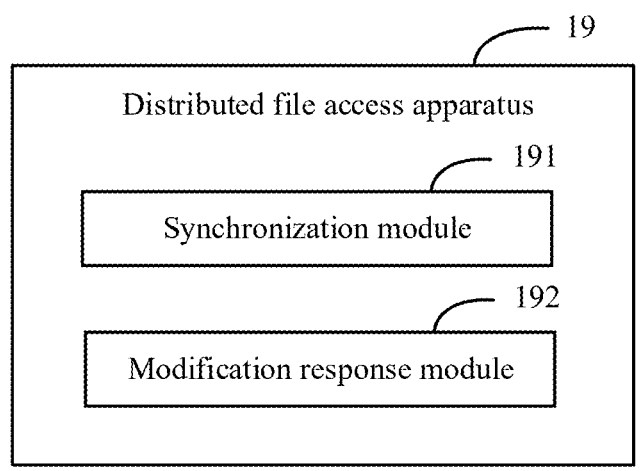
FIG. 19 is a schematic diagram of functional modules of a distributed file access apparatus applied to a second electronic device according to an embodiment of this application.

FIG. 19 is a schematic diagram of functional modules of a distributed file access apparatus 19 according to an embodiment of this application. The distributed file access apparatus 19 is applied to a second electronic device, and the second electronic device is in communication connection to a first electronic device. The distributed file access apparatus 19 includes a synchronization module 191 and a modification response module 192.

The synchronization module 191 is configured to synchronize metadata of a first file to the first electronic device.

The modification response module 192 is configured to: if a modification record obtaining request sent by the first electronic device is received, return the file modification record of the first file to the first electronic device. If a file modification request for the first file that is sent by the first electronic device is received, the modification response module 192 modifies the first file according to the file modification request.

The modification response module 192 is further configured to update the file modification record of the first file and the metadata of the first file, and synchronize the updated metadata of the first file to the first electronic device.

Figure 20:
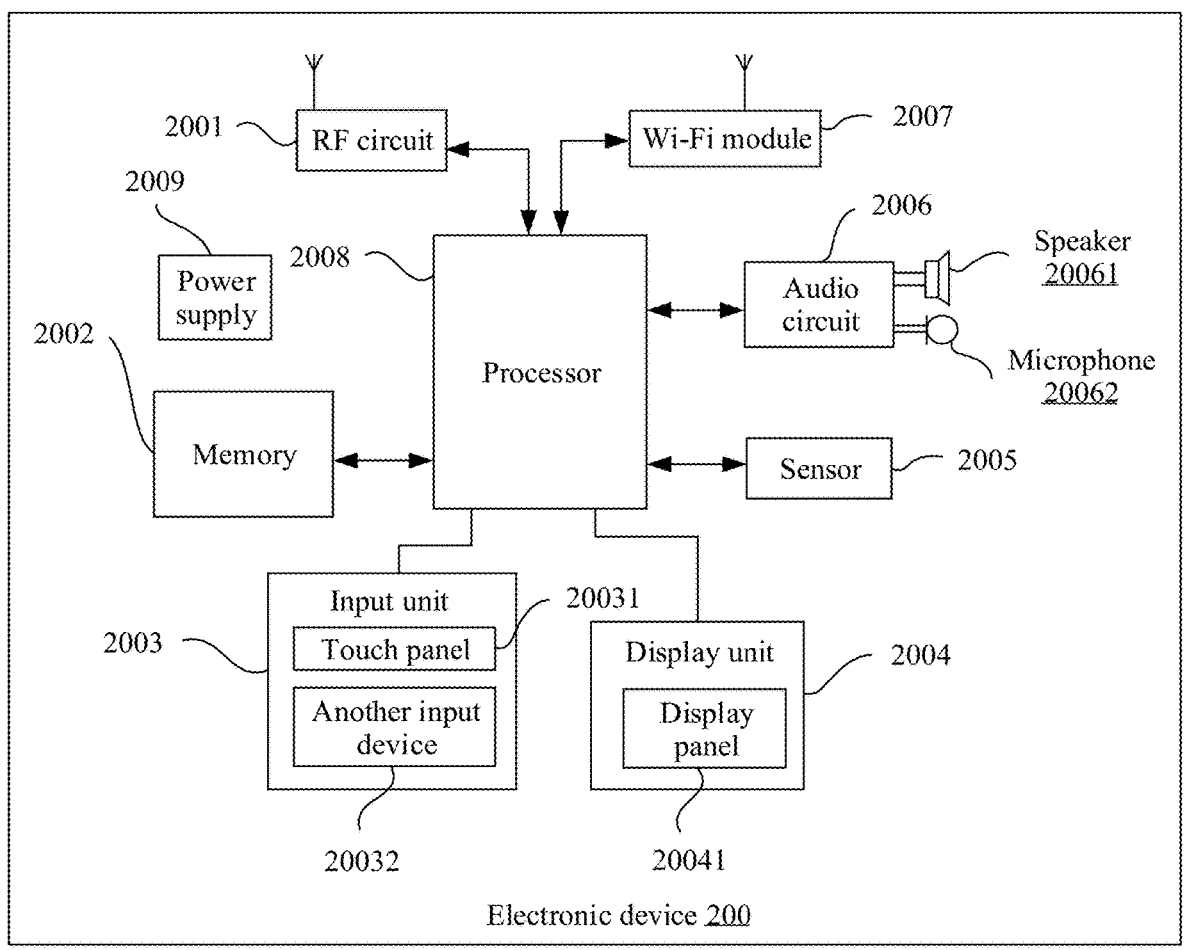
FIG. 20 is a schematic diagram of a structure of an electronic device according to an embodiment of this application.

FIG. 20 is a schematic diagram of a structure of an electronic device (a first electronic device or a second electronic device) according to an embodiment of this application. As shown in FIG. 20, the electronic device 200 may include components such as a radio frequency (Radio Frequency, RF) circuit 2001, a memory 2002, an input unit 2003, a display unit 2004, a sensor 2005, an audio circuit 2006, a Wireless Fidelity (wireless fidelity, Wi-Fi) module 2007, a processor 2008, and a power supply 2009. A person skilled in the art may understand that the structure shown in FIG. 20 does not constitute a limitation on the electronic device, and the electronic device may include more or fewer components than those shown in the figure, or combine some components, or have different component arrangements.

The RF circuit 2001 may be configured to receive and send signals in an information sending and receiving process or in a call process. Particularly, after receiving downlink information from a base station, the RF circuit 2001 forwards the downlink information to the processor 2008 for processing. In addition, the RF circuit 2001 sends related uplink data to the base station. Generally, the RF circuit 2001 includes but is not limited to an antenna, at least one amplifier, a transceiver, a coupler, a low noise amplifier (Low Noise Amplifier, LNA), a duplexer, and the like.

The memory 2002 may be configured to store a software program and a module. The processor 2008 runs the software program and the module that are stored in the memory 2002, to execute various function applications and data processing of the electronic device. The memory 2002 may mainly include a program storage area and a data storage area. The program storage area may store an operating system, an application required for at least one function (such as a sound play function and an image play function), and the like. The data storage area may store data created according to use of the electronic device (such as audio data and a phone book), and the like. In addition, the memory 2002 may include a high-speed random access memory, or may include a non-volatile memory such as at least one magnetic disk storage device, a flash memory device, or another volatile solid-state storage device.

The input unit 2003 may be configured to: receive input digit or character information and generate key signal input related to user settings and function control of the electronic device. Specifically, the input unit 2003 may include a touch panel 20031 and another input device 20032. The touch panel 20031, also referred to as a touchscreen, may collect a touch operation of a user on or near the touch panel 20031 (for example, an operation of the user on or near the touch panel 20031 by using any suitable object or accessory, for example, a finger or a stylus), and drive a corresponding connection apparatus according to a preset program. Optionally, the touch panel 20031 may include two parts: a touch detection apparatus and a touch controller. The touch detection apparatus detects a touch location of the user, detects a signal along with a touch operation, and transfers the signal to the touch controller. The touch controller receives touch information from the touch detection apparatus, converts the touch information to touch point coordinates, sends the touch point coordinates to the processor 2008, and receives and executes a command sent by the processor 2008. In addition, the touch panel 20031 may be implemented by using a plurality of types, such as a resistive type, a capacitive type, an infrared ray type, and a surface acoustic wave type. In addition to the touch panel 20031, the input unit 2003 may further include another input device 20032. Specifically, the another input device 20032 may include, but is not limited to, one or more of a physical keyboard, a functional key (for example, a volume control key or an on/off key), a trackball, a mouse, and a joystick.

The display unit 2004 may be configured to display information entered by the user, information provided for the user, and various menus of the electronic device. The display unit 2004 may include a display panel 20041. Optionally, the display panel 20041 may be configured in a form of a liquid crystal display (LCD), an organic light-emitting diode (OLED), or the like. Further, the touch panel 20031 may cover the display panel 20041. After detecting a touch operation on or near the touch panel 20031, the touch panel 20031 transfers the touch operation to the processor 2008, to determine a type of a touch event. Subsequently, the processor 2008 provides corresponding visual output in the display panel 20041 according to the type of the touch event. Although the touch panel 20031 and the display panel 20041 are used as two separate components to implement input and output functions of the electronic device in FIG. 20, in some embodiments, the touch panel 20031 and the display panel 20041 may be integrated to implement the input and output functions of the electronic device.

The electronic device may further include at least one type of sensor 2005, such as a light sensor, a motion sensor, and another sensor. Specifically, the light sensor may include an ambient light sensor and a proximity sensor. The ambient light sensor may adjust brightness of the display panel 20041 according to intensity of ambient light. The proximity sensor may turn off the display panel 20041 and/or backlight when the electronic device moves close to an ear. As a type of motion sensor, an accelerometer sensor may detect values of acceleration in various directions (there are usually three axes), may detect a value and a direction of gravity when the electronic device is stationary, and may be used for an application of recognizing a posture of the electronic device (for example, landscape/portrait mode switching, a related game, or magnetometer posture calibration), a vibration recognition related function (for example, a pedometer or a stroke), and the like. In addition, other sensors may be disposed for the electronic device, such as a gyroscope, a barometer, a hygrometer, a thermometer, and an infrared sensor. Details are not described herein.

The audio circuit 2006, a speaker 20061, and a microphone 20062 may provide an audio interface between a user and the electronic device. The audio circuit 2006 can transmit, to the speaker 20061, an electrical signal converted from received audio data, and the speaker 20061 converts the electrical signal to a sound signal for outputting. In addition, the microphone 20062 converts a collected sound signal to an electrical signal, and audio circuit 2006 receives the electrical signal and then converts the electrical signal to audio data. Then the audio data is output to the processor 2008 for processing and then sent to another electronic device through the RF circuit 2001; or the audio data is output to the memory 2002 for further processing.

Wi-Fi is a short-range wireless transmission technology. The electronic device may help, by using the Wi-Fi module 2007, the user receive and send emails, browse a web page, access streaming media, and the like, to provide wireless broadband Internet access for the user. Although FIG. 20 shows the Wi-Fi module 2007, it may be understood that the Wi-Fi module 2007 is not a mandatory component of the electronic device, and may be omitted according to a requirement without changing the essence of the present invention.

The processor 2008 is a control center of the electronic device, connects to various parts of the entire electronic device by using various interfaces and lines, and executes various functions and data processing of the electronic device by running or executing a software program and/or a module stored in the memory 2002 and invoking data stored in the memory 2002, so as to perform overall monitoring on the electronic device. Optionally, the processor 2008 may include one or more processing units. Preferably, an application processor and a modem may be integrated into the processor 2008. The application processor mainly processes an operating system, a user interface, an application, and the like. The modem mainly processes wireless communication. It may be understood that the foregoing modem processor may alternatively not be integrated into the processor 2008.

The electronic device further includes the power supply 2009 (for example, a battery) that supplies power to all the components. Optionally, the power supply may be logically connected to the processor 2008 by using a power management system, so as to implement functions, such as charging management, discharging management, and power consumption management, by using the power management system.

Although not shown in the figure, the electronic device may further include a camera, a Bluetooth module, and the like, and details are not described herein.

The electronic device described in FIG. 20 may be configured to implement some or all of the procedures in the method embodiments described in FIG. 13A-FIG. 13B to FIG. 16A-FIG. 16C of this application. For details, refer to related descriptions in the foregoing embodiments described in FIG. 13A-FIG. 13B to FIG. 16A-FIG. 16C. Details are not described herein again. An embodiment further provides a computer storage medium. The computer storage medium stores computer instructions. When the computer instructions are run on an electronic device, the electronic device is enabled to perform the foregoing related method steps, to implement the distributed file access methods in the foregoing embodiments.

This embodiment further provides a computer program product. When the computer program product runs on an electronic device, the electronic device is enabled to perform the foregoing related steps, to implement the distributed file access methods in the foregoing embodiments.

In addition, an embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, so that the chip performs the distributed file access methods in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing functional modules is used as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division in actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected according to an actual requirement to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A distributed file access method, comprising:
receiving, by a first electronic device, a read instruction for a first file, wherein the first electronic device has a communication connection to a second electronic device, and the first electronic device stores metadata of the first file stored on the second electronic device, the metadata of the first file comprises a file modification type and a first modification tag, wherein the file modification type comprises at least one of the following: a terminalless write type, a single-terminal write type, an occasional multi-terminal write type, or a frequent multi-terminal write type;
reading, by the first electronic device, the file modification type and the file modification tag of the first file; and
reading, by the first electronic device, the first file according to the file modification type and the file modification tag of the first file.

2. The distributed file access method according to claim 1, wherein the reading, by the first electronic device, the first file according to the file modification type and the file modification tag comprises:
in response to the file modification type of the first file being the frequent multi-terminal write type, reading, by the first electronic device, the first file from the second electronic device.

3. The distributed file access method according to claim 1, wherein the reading, by the first electronic device, the first file according to the file modification type and the file modification tag comprises:
in response to the file modification type of the first file being the terminalless write type, the single-terminal write type, or the occasional multi-terminal write type, and the first file not being in a local cache of the first electronic device,
downloading, by the first electronic device, the first file from the second electronic device;
caching, by the first electronic device, the first file locally; and
reading, by the first electronic device, the first file from the local cache of the first electronic device.

4. The distributed file access method according to claim 1, wherein the reading, by the first electronic device, the first file according to the file modification type and the file modification tag comprises:

in response to the file modification type of the first file being the terminalless write type, and the first file being in a local cache of the first electronic device, or in response to the file modification type of the first file being the single-terminal write type or the occasional multi-terminal write type, the first file being in a local cache of the first electronic device, and a device identifier (ID) in the file modification tag of the first file being the same as a device ID of the first electronic device:

reading, by the first electronic device, the first file from the local cache of the first electronic device.

5. The distributed file access method according to claim 1, wherein the reading, by the first electronic device, the first file according to the file modification type and the file modification tag comprises:

in response to the file modification type of the first file being the single-terminal write type or the occasional multi-terminal write type, the first file being in the local cache, and a device identifier (ID) in the file modification tag of the first file being different from a device ID of the first electronic device, obtaining, by the first electronic device, a file modification record of the first file from the second electronic device; and updating, by the first electronic device, the first file according to the file modification record of the first file, and reading the updated first file.

6. The distributed file access method according to claim 5, wherein the file modification record comprises modification location information and a modified part, and the updating, by the first electronic device, the first file according to the file modification record of the first file comprises:

updating, by the first electronic device, according to the modification location information, the modified part of the first file locally cached by the first electronic device; or the file modification record comprises the modification location information and a size of modified data, and the updating, by the first electronic device, the first file according to the file modification record of the first file comprises:

obtaining, by the first electronic device, the modified part of the first file from the second electronic device according to the modification location information and the size of the modified data; and updating, by the first electronic device, according to the modification location information, the modified part of the first file locally cached by the first electronic device.

7. The distributed file access method according to claim 1, wherein the first electronic device further stores a second file, metadata of the second file, and a file modification record of the second file, the second electronic device stores the metadata of the second file, and the method further comprises:

obtaining, by the first electronic device, a modification instruction for the second file;

in response to the modification instruction for the second file, modifying, by the first electronic device, the second file; and updating, by the first electronic device, the file modification record of the second file.

8. The distributed file access method according to claim 7, wherein the method further comprises:

updating, by the first electronic device, a file modification type and a file modification tag in the metadata of the second file according to the file modification record of the second file; and synchronizing, by the first electronic device, the updated metadata of the second file to the second electronic device.

9. A distributed file access method, applied to a second electronic device, wherein the second electronic device has a communication connection to a first electronic device, the method comprises:

synchronizing, by the second electronic device, the metadata of the first file to a first electronic device, wherein the second electronic device stores a first file, metadata of the first file, and a file modification record of the first file, the metadata comprises a file modification type and a file modification tag;

receiving, by the second electronic device, a modification record obtaining request sent by the first electronic device; and in response to the receiving, sending, by the second electronic device, the file modification record of the first file to the first electronic device.

10. The distributed file access method according to claim 9, wherein the method further comprises:

receiving, by the second electronic device, a file modification request for the first file that is sent by the first electronic device;

in response to the receiving, modifying, by the second electronic device, the first file according to the file modification request;

updating, by the second electronic device, the file modification record of the first file;

updating, by the second electronic device, the metadata of the first file; and synchronizing, by the second electronic device, the updated metadata of the first file to the first electronic device.

11. A first electronic device, comprising:

a memory configured to store program instructions;

a processor configured to execute the program instructions, causing the first electronic device to perform:

receiving a read instruction for a first file, wherein the first electronic device stores metadata of a first file stored on a second electronic device, the metadata of the first file comprises a file modification type and a first modification tag, wherein the file modification type comprises at least one of the following: a terminalless write type, a single-terminal write type, an occasional multi-terminal write type, or a frequent multi-terminal write type;

reading the file modification type and the file modification tag of the first file; and reading the first file according to the file modification type and the file modification tag of the first file.

12. The first electronic device according to claim 11, wherein the processor is configured to execute the program instructions, further causing the first electronic device to perform:

if the file modification type of the first file is the frequent multi-terminal write type, reading the first file from the second electronic device.

13. The first electronic device according to claim 11, wherein the processor is configured to execute the program instructions, further causing the first electronic device to perform:

if the file modification type of the first file is the terminalless write type, the single-terminal write type, or the occasional multi-terminal write type, and the first file is not in a local cache of the first electronic device,
downloading the first file from the second electronic device;
caching the first file locally; and
reading the first file from the local cache of the first electronic device.

14. The first electronic device according to claim 11, wherein the processor is configured to execute the program instructions, further causing the first electronic device to perform:
if the file modification type of the first file is the terminalless write type, and the first file is in a local cache of the first electronic device, or if the file modification type of the first file is the single-terminal write type or the occasional multi-terminal write type, the first file is in a local cache of the first electronic device, and a device identifier (ID) in the file modification tag of the first file is the same as a device ID of the first electronic device,
reading the first file from the local cache of the first electronic device.

15. The first electronic device according to claim 11, wherein the processor is configured to execute the program instructions, further causing the first electronic device to perform:
if the file modification type of the first file is the single-terminal write type or the occasional multi-terminal write type, the first file is in the local cache, and a device identifier (ID) in the file modification tag of the first file is different from a device ID of the first electronic device,
obtaining a file modification record of the first file from the second electronic device; and
updating the first file according to the file modification record of the first file, and reading the updated first file.

16. The first electronic device according to claim 15, wherein the processor is configured to execute the program instructions, further causing the first electronic device to perform:
updating according to the modification location information, the modified part to the first file locally cached by the first electronic device; or
obtaining the modified part of the first file from the second electronic device according to the modification location information and the size of the modified data and updating according to the modification location information, the modified part to the first file locally cached by the first electronic device.

17. A first electronic device, comprising:
a memory configured to store program instructions;
a processor configured to execute the program instructions, causing the first electronic device to perform:
receiving a read instruction for a first file, wherein the electronic device stores metadata of a first file stored on a second electronic device, the metadata of the first file comprises a file modification type and a first modification tag;
reading the file modification type and the file modification tag of the first file; and
reading the first file according to the file modification type and the file modification tag of the first file;
wherein the first electronic device further stores a second file, metadata of the second file, and a file modification record of the second file, and the processor is configured to execute the program instructions, further causing the first electronic device to perform:
obtaining a modification instruction for the second file;
in response to the modification instruction for the second file, modifying the second file; and
updating the file modification record of the second file.

18. The first electronic device according to claim 17, wherein the processor is configured to execute the program instructions, further causing the first electronic device to perform:
updating a file modification type and a file modification tag in the metadata of the second file according to the file modification record of the second file; and
synchronizing the updated metadata of the second file to the second electronic device.

19. The distributed file access method according to claim 1, wherein the first modification tag including a device identifier (ID) indicating a device that modifies the first file, the device is a same device as the first electronic device or a different device from the first electronic device.

20. The first electronic device according to claim 11, wherein the first modification tag including a device identifier (ID) indicating a device that modifies the first file, the device is a same device as the first electronic device or a different device from the first electronic device.

* * * * *